INVENTORS:
VLADIMIR H. PAVLECKA
BY: FREDERICK DALLENBACH
THEIR ATTORNEY:

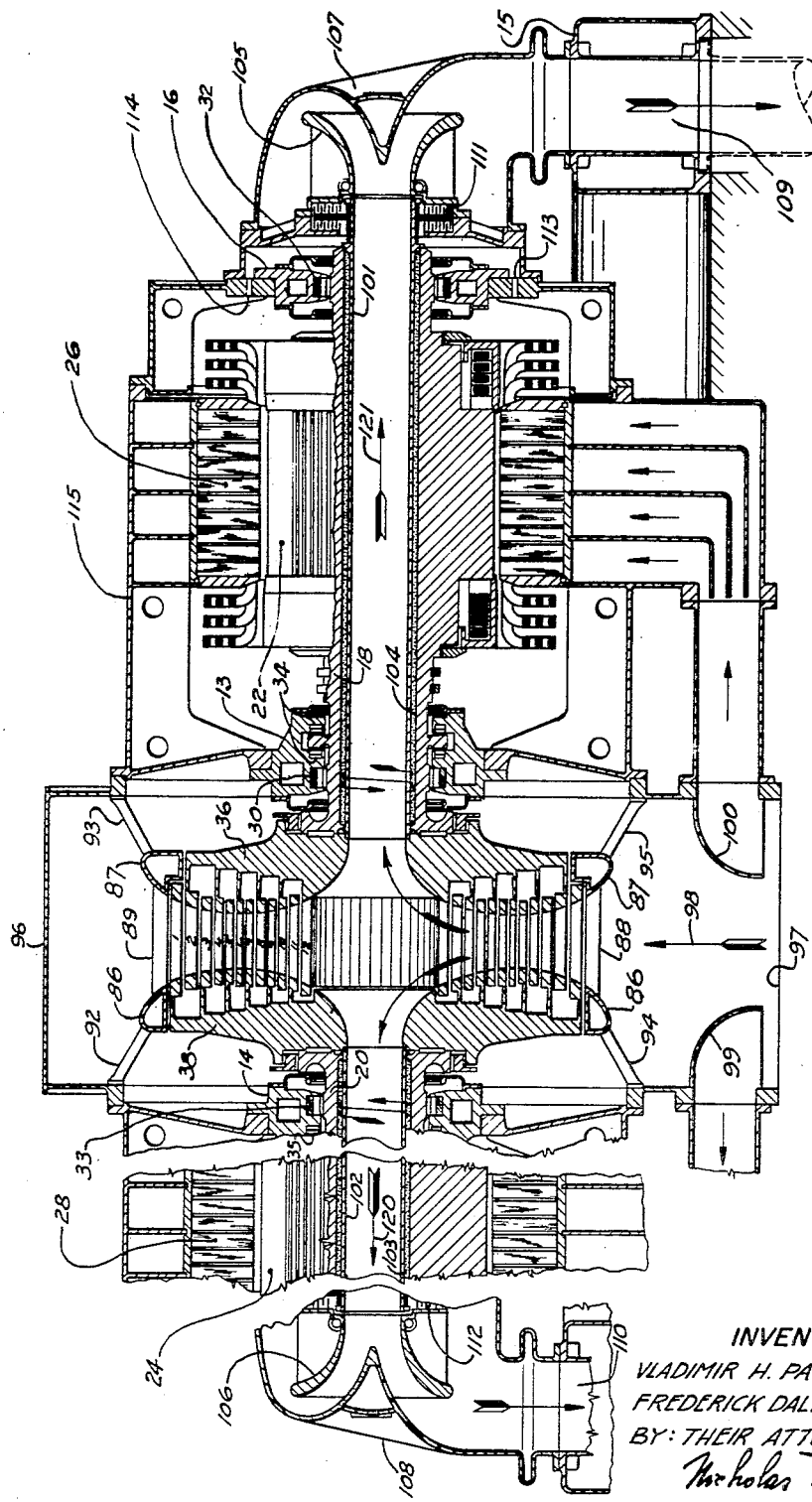

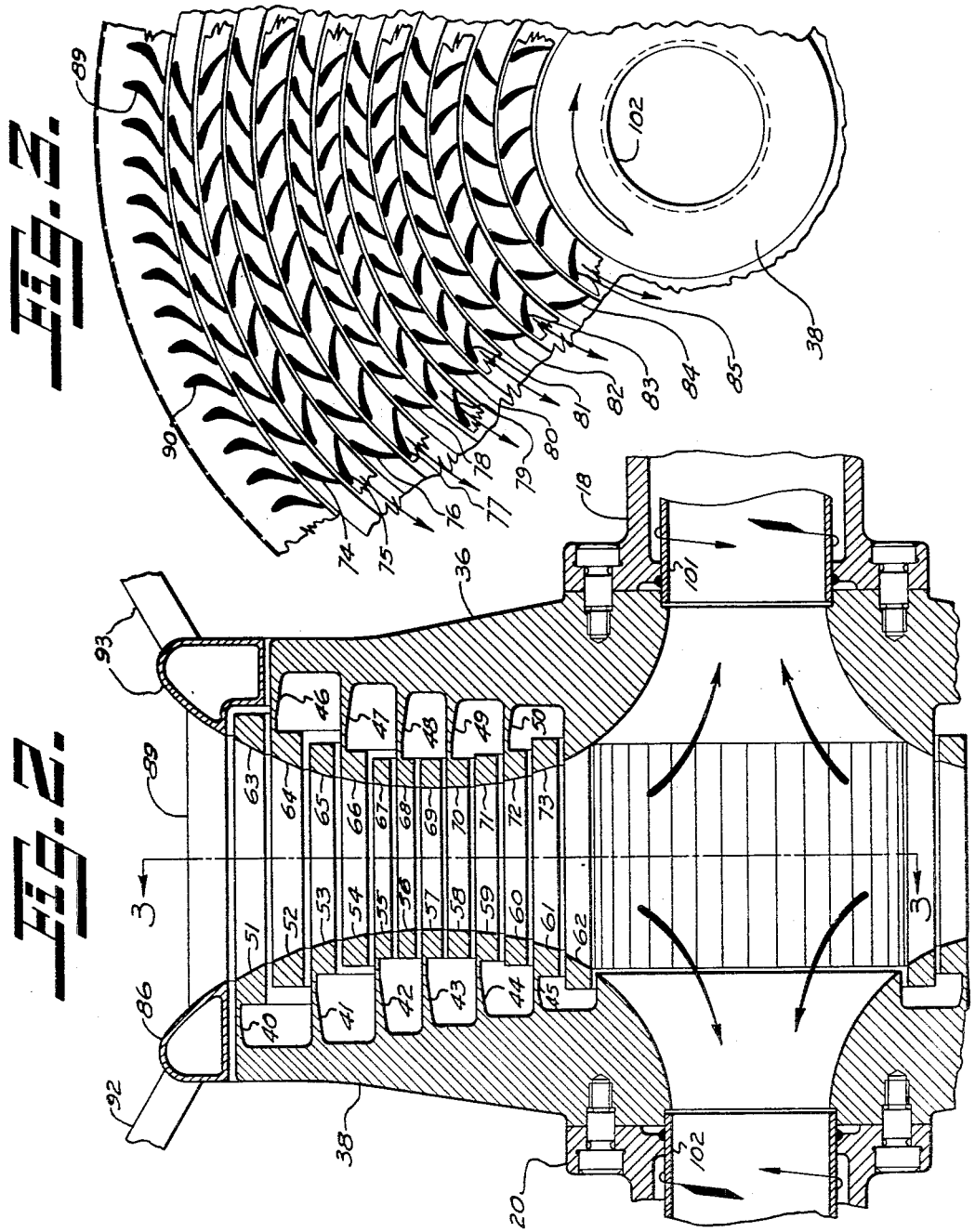

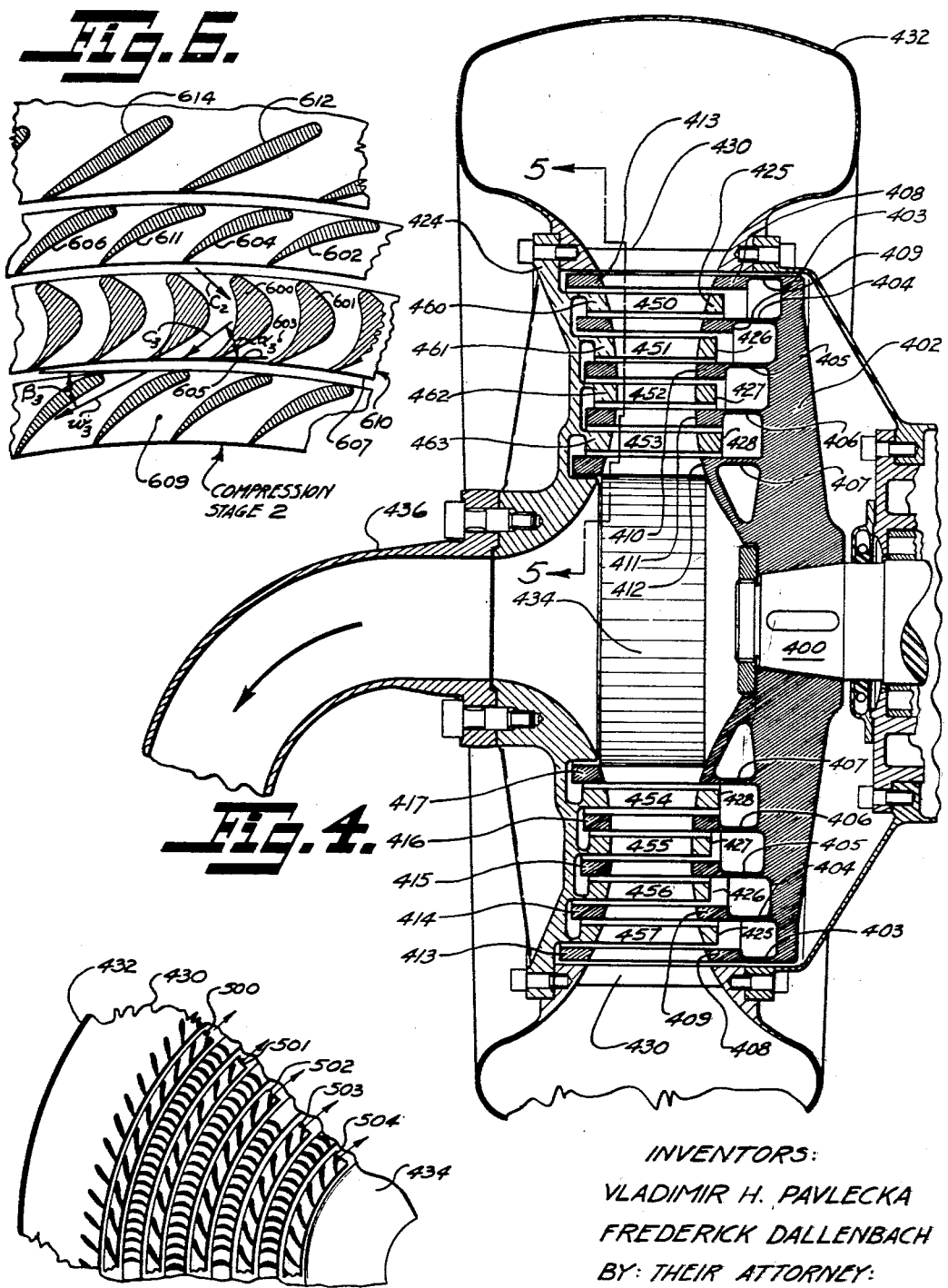

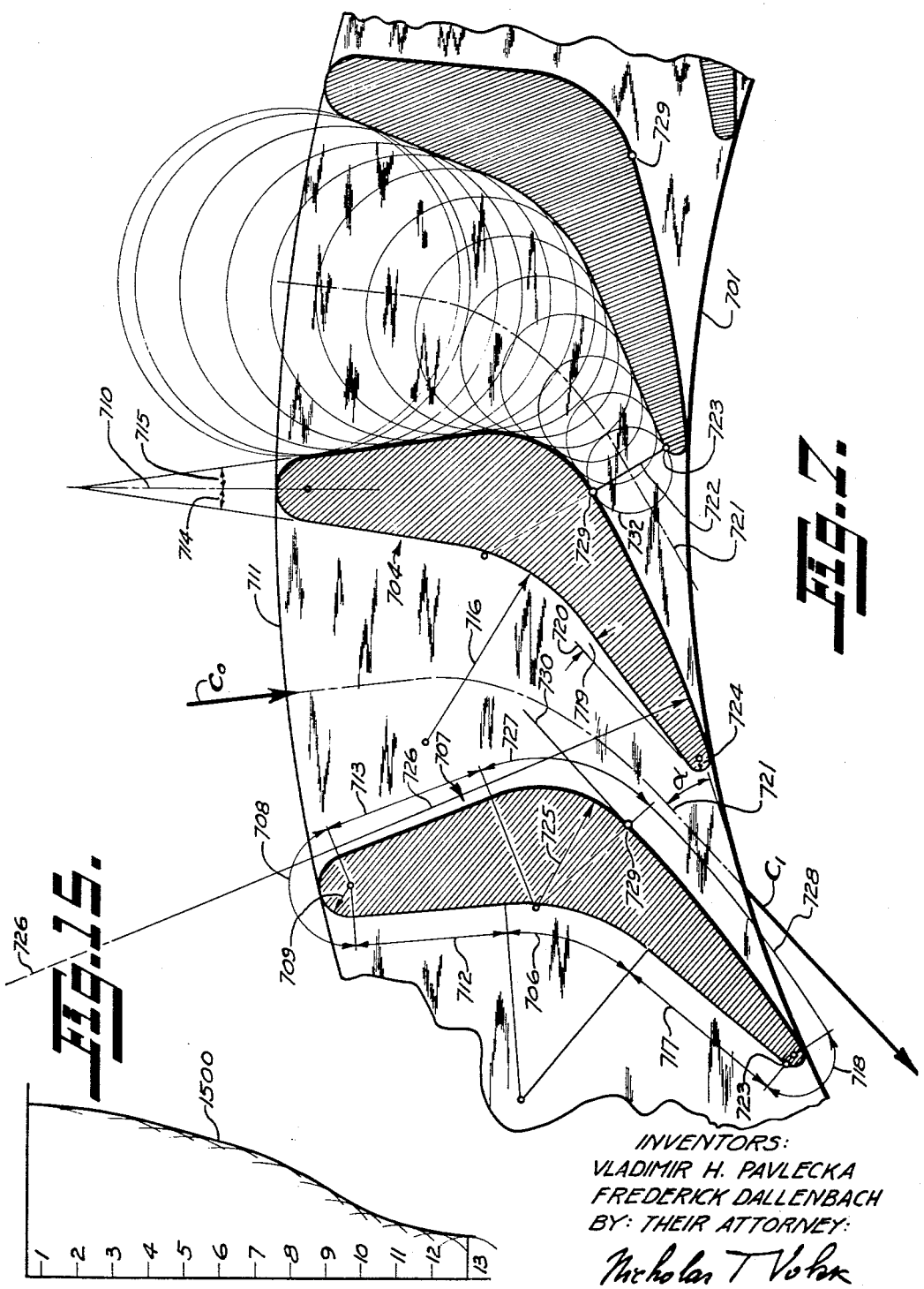

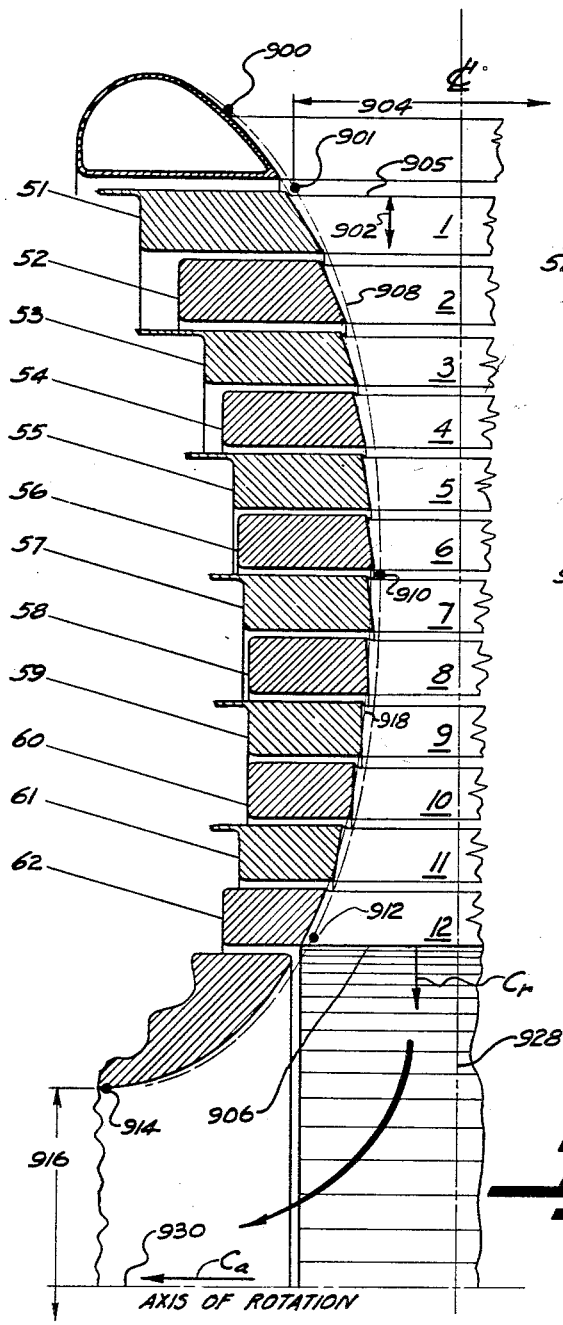
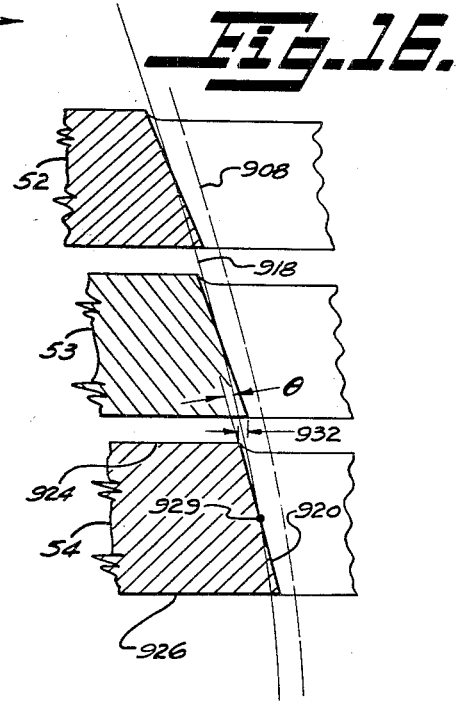

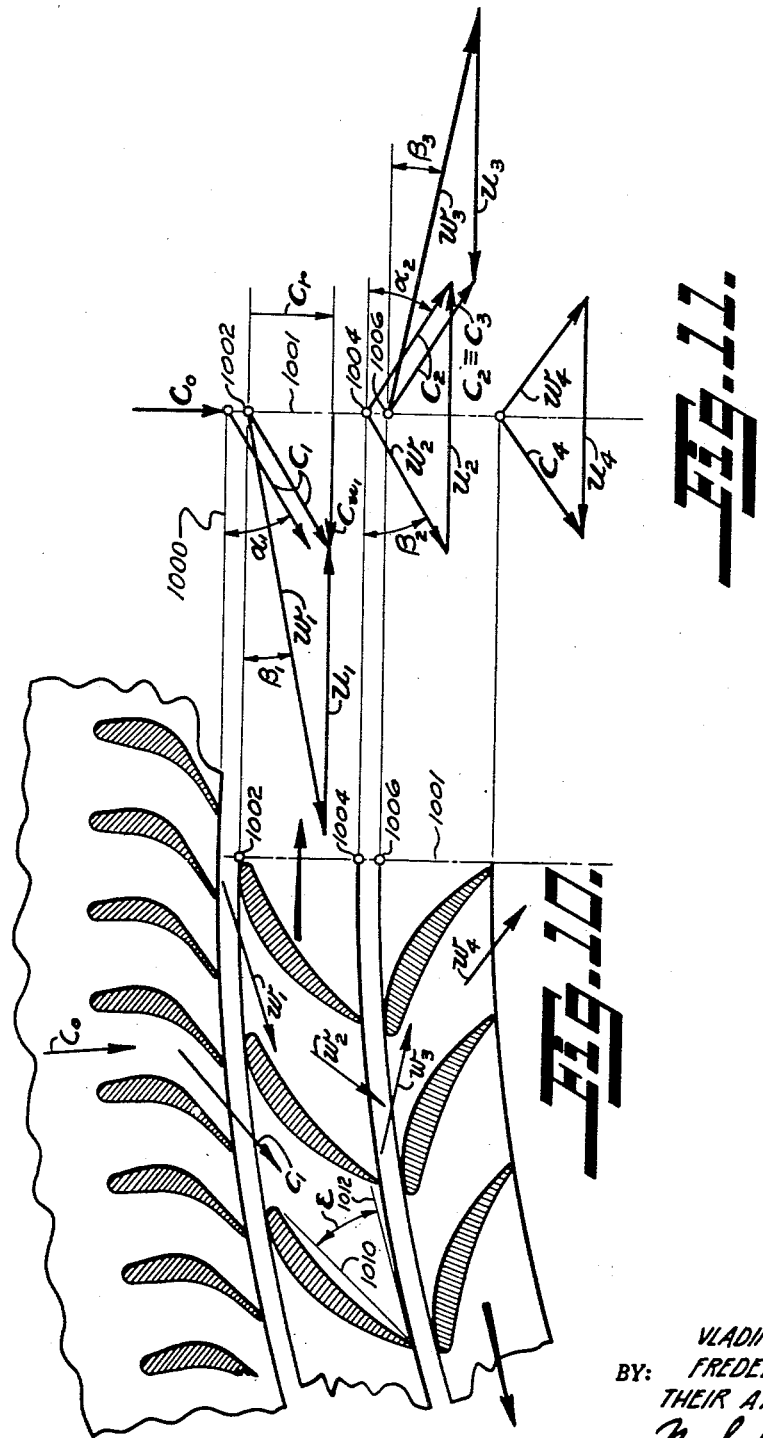

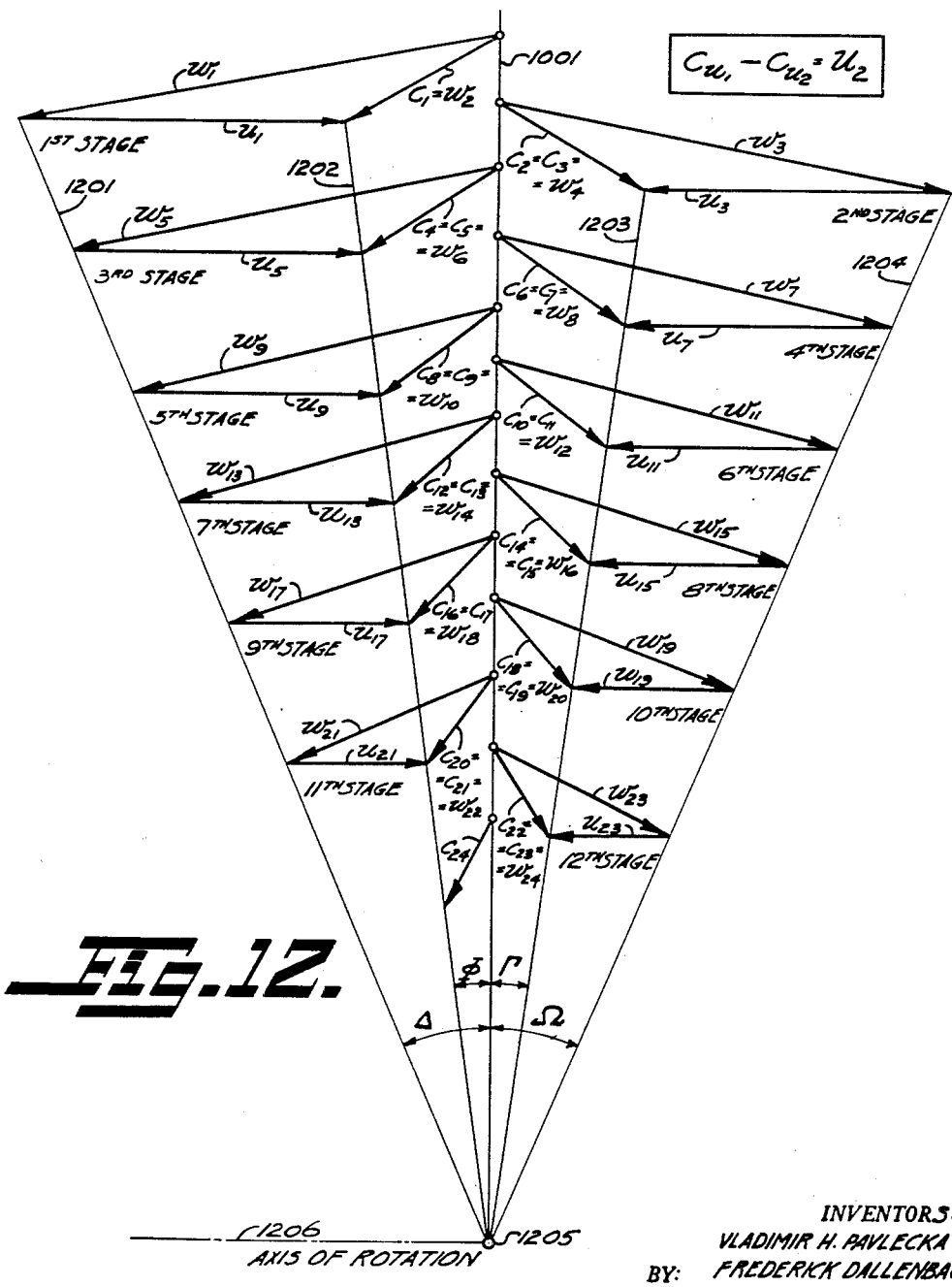

United States Patent Office 2,712,895
Patented July 12, 1955

2,712,895

CENTRIPETAL SUBSONIC COMPRESSOR

Vladimir H. Pavlecka, Pacific Palisades, and Frederick Dallenbach, Inglewood, Calif.

Application August 12, 1950, Serial No. 179,028

26 Claims. (Cl. 230—124)

This invention relates to novel methods of compressing elastic fluids from low pressures to high pressures, the compression being obtained from the outer periphery of rotary compressors toward their axes of rotation, i. e., the compressions are obtained in radial direction, from the outer periphery toward the center. The disclosed compressors, therefore, are of centripetal type.

This application is a continuation in part of the application Serial No. 557,655, filed October 7, 1944, now Patent No. 2,626,501, entitled "Gas Turbine System."

According to one version, the disclosed centripetal compressors comprise a series of concentric and mutually interleaved rings of blades, which have the form of airfoils, arranged in a cascade and concentric relationship with respect to each other. The even numbered rings are integrated by means of a side disc into one rotating unit, while the odd-numbered rings are similarly integrated by means of an identical side disc into the second rotating unit, the two units being rotated in the opposite directions for obtaining high compression ratio per stage, and maximum obtainable overall compression ratio for the entire compressor.

The preferred form of the compressor utilizes two counter-rotating units, while another embodiment of the invention discloses only a single rotating unit, the second unit being stationary.

Overall compression ratios of the order of 15:1 are obtainable with the disclosed compressors.

Compression of compressible fluids now is being performed by two types of dynamic compressors known to the prior art, namely axial compressors and centrifugal compressors.

Axial compressors have relatively high efficiency but low compression ratio. The compression ratio of the axial compressors cannot be raised to the desired high ratio because any increase in staging for this purpose produces thickening of the boundary layer, which puts a definite limit to the practicable staging. Centrifugal compressors have relatively high compression ratio but low efficiency, because of separation of flow in the rotors and stators, this separation being inherent and unavoidable in the centrifugal compressors because of the geometry of the fluid dynamics, and the concomitant thermodynamics, to which these compressors are restricted. Both types of compressors, i. e., axial and centrifugal, are limited in their performance by the unavoidable existence of secondary forces, causing disturbing influences upon the flows within the channels of these compressors, e. g., radial pressure gradient, blade tip leakage, thickening of the boundary layer, the influence from the Coriolis acceleration in the centrifugal flow machines, and the unavoidable three-dimensional flow within the axial flow machines, all tending either to decrease the thermodynamic efficiency or reduce the attainable compression ratio, or both.

The axial flow compressors, besides, are expensive to construct because of twist and changing profile from root to tip of the blades and because a large number of blades is required for attaining even a medium compression ratio. Thus, the axial compressors are excessively large even for medium compression ratios, and the centrifugal compressors are excessively large in diameter and deliver the compressed fluid in the least suitable part of the machine, i. e., at its outermost periphery.

Neither one of these two compressors has the inherently suitable configuration for the compression of elastic fluids, nor are their configurations and basic geometries such as to deliver the products of compression in a suitable form and place for final utilization in the explosion chambers and subsequent turbines or jets with which they are used. Stated more exactly, the products of compression are delivered at a geometrically opposite place than the one that is desired for their proper final fluid dynamic and thermodynamic utilization. Accordingly, all thermodynamic cycles obtainable with the compressors of this type are basically fluid dynamically and thermodynamically unsound, because the obtainable geometries lead one completely astray from the paths which are imperative for efficient thermodynamic and fluid dynamic utilization of the products of compression.

The disclosed centripetal compressors compress elastic fluids from the outermost periphery of its first stage, through a number of rotating radial inflow stages, toward a central chamber situated at the center of rotation. This flow principle determines the functional structure of the centripetal compressors, which are composed of a number of rotor stages, each stage having a plurality of airfoils uniformly distributed around the periphery of the stage. The first, outermost rotor stage, is surrounded along its outer periphery by a stationary prerotation stage, which receives air in the radially inward direction, in one embodiment of the invention.

It is, therefore, an object of this invention to provide centripetal compressors having a prerotation stage and a plurality of concentric compression stages.

It is an additional object of this invention to provide centripetal compressors with a prerotation stage producing maximum relative velocity of the fluid and a plurality of compression stages, each stage having a plurality of diffusion channels where high kinetic energy of the fluid, obtained at the exit from the prerotation stage, is converted into a pressure energy through gradual diffusion of the fluid under compression.

It is another object of this invention to provide centripetal compressors having a prerotation stage, said stage having a preacceleration region and an acceleration region, and a plurality of compression stages having an overall maximum compression ratio of the order of 15:1.

Yet another object of this invention is to provide centripetal compressors in which the maximum relative velocity of fluid at the point of entry into the first compression stage is of the order of 0.95 Mach number, in subsonic configuration.

Still an additional object of this invention is to provide centripetal compressors having a plurality of compression stages, each stage having a plurality of flow channels, the maximum angle of turning of these flow channels being of the order of 50°, and the percent of maximum diffusion of the order of 3 to 1.

Still another object of this invention is to provide centripetal compressors having variable width overall flow channel for introducing volumetric correction into said channel, said correction being determined by the equation of state and continuity of the fluid under compression.

Yet another object of this invention is to provide centripetal compressors in which each compression stage has the shape of a funnel, with respect to the succeeding stage, in the plane perpendicular to the axis of rotation.

Still another object of this invention is to provide centripetal compressors having a plurality of compression stages, each stage having a plurality of airfoils with the leading edge of each foil having a finite radius to permit variable speed operation of said compressors, said airfoils having a uniform angle of pitch within any given compression stage, and progressively increasing angles of pitch from the outer to the inner stage of said compressor, the magnitudes of the respective angles being an inverse function of the radial distance of any given stage from the axis of rotation.

An additional object of this invention is to provide a centripetal compressor having a plurality of compression stages, and a corresponding plurality of fluid-turning stages having constant width channels.

Other objects and features of the present invention will appear more fully hereinafter from the following detailed description when considered in connection with the accompanying drawings which disclose several embodiments of the invention. It is expressly to be understood, however, that the drawings are used here only for the purpose of illustration and are not to be considered as a definition of the limits of the invention, reference for the latter purpose being had to the appended claims.

In the drawings, wherein similar reference characters denote similar elements throughout the several views:

Fig. 1 is a vertical axial cross-sectional view of a centripetal, contra-rotating compressor driven by electric motors;

Fig. 3 is a transverse section of a sector of the compressor illustrated in Fig. 2;

Fig. 4 is a vertical axial cross-section of a centripetal, single rotation compressor;

Fig. 5 is a transverse section of a sector of the compressor illustrated in Fig. 4;

Fig. 6 is an enlarged transverse section of a prerotation stage, two rotor stages, and one stator stage;

Fig. 7 is an enlarged transverse section of a prerotation stage;

Fig. 8 is an enlarged transverse section of a single compression stage;

Fig. 9 is a vertical, axial section of the entire flow channel of the compressor illustrated in Figs. 1, 2, and 4;

Fig. 10 is an enlarged transverse section of the prerotation stage and two contra-rotating compression stages;

Fig. 11 is a velocity vector diagram for the stages illustrated in Fig. 10;

Fig. 12 is a complete velocity vector diagram for the compressor illustrated in Figs. 1, 2, and 3;

Fig. 15 is a curve illustrating the acceleration rates obtainable in the prerotation stage;

Fig. 16 is an enlarged cross-sectional view, in section, of the left portion of three compression blades.

Figure 2:
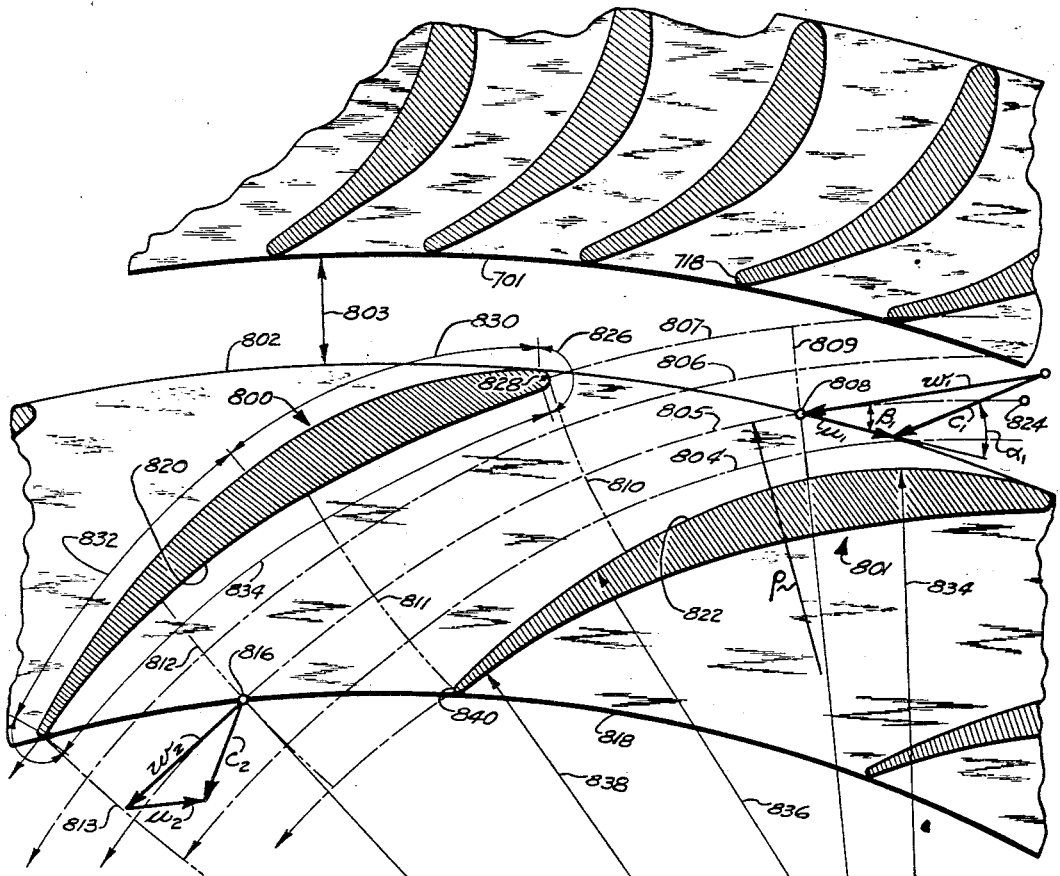
Fig. 2 is a vertical axial cross-section of the upper part of a centripetal contra-rotating compressor having twelve compression stages.

Referring to Figs. 1, 2, and 3, they illustrate a twelve stage centripetal compressor. The compressor is mounted on a base frame 15 which supports, by means of four bearing housings, all rotating elements of the compressor plant. Only three bearing housings, 13, 14, and 16 are visible in Fig. 1. The rotating elements include two counter-rotating shafts 18 and 20, rotors 22 and 24 of two synchronous motors 26 and 28, four bearings, preferably of the Michell type, only three of which, bearings 30, 32, and 33 being visible in Fig. 1, two side-thrust bearings 34 and 35, side-discs 36 and 38 of the compressor, and twelve compression stages 1 through 12, which are illustrated on a larger scale in Fig. 2. Fig. 3 illustrates a transverse cross-sectional view or side-view of the same twelve stages. Each stage is supported from its side disc by means of expansion hoops 40 through 50, the odd-numbered stages being supported by the side-disc 38, while the even-numbered stages are supported by the side disc 36. The expansion hoops 40 through 50 are integral parts of their respective side discs 38 and 36, the discs and the hoops being centrifugally cast steel castings machined to proper dimensions. The hoops 40 through 50 are tapered toward the center of the compressor to allow relatively free radial expansion of the hoops to follow the radial expansions of rings 51 through 73 which are welded to their respective expansion hoops 40 through 50. The rings 51 through 73 are centrifugally cast steel rings. The inner ends of the rings are used for supporting the compressor blades, such as blades 74 through 85 illustrated in their cross-sectional views in Fig. 3. As illustrated in Fig. 3, the blades are air-foils of a highly cambered profile which will be discussed more in detail in connection with the description of Fig. 8.

The airfoil blades are welded to the respective rings and the welded joints are subsequently machined down to smooth finish. The fluid dynamic and thermodynamic characteristics of the compression stages of the compressor will be discussed more in detail in connection with the description of Figs. 7 through 14.

The compressor is surrounded with a prerotational stage consisting of two stationary, peripherally continuous inflow rings 86 and 87 surrounding the first stage of the compressor rotor and a plurality of blades 89, 90, etc., which form acceleration flow channels for radially flowing compressible fluid; these acceleration flow channels also direct the flow of the fluid so that it is in proper vectorial direction with respect to the first rotor stage. The shape of the blades and the behavior of the fluid in the pre-compression stage will be described more fully in connection with the description of Fig. 7.

The prerotation stage is radially attached to frame 15 by means of a plurality of circumferential braces, only four braces 92 through 95 being illustrated in Fig. 1. The entire compressor unit is housed in a hood 96 supported by frame 15, the hood having an opening 97 for admitting the fluid to be compressed into the compressor, as illustrated by an arrow 98. The hood opening may be provided with two ventilation inlet ducts 99 and 100, which supply proper cooling medium for the stators and rotors of the synchronous motors.

The two shafts 18 and 20 are provided with metal linings 101 and 102 and insulating sleeves 103 and 104 which prevent heat flow from the compressed air into the frame and the rotors of the synchronous motors. The metal linings 101 and 102 constitute the inner ducts for the compressed fluid which flows in these ducts in the directions indicated by the arrows 120 and 121. The compressed fluid, upon its emergence from the linings 101 and 102, reaches stationary diffusing funnels 105, 106, and hoods 107 and 108 which terminate in outlet ducts 109 and 110. Labyrinth seals 111 and 112 are used for making frictionless connection between the rotating elements and the frame of the compressor, ducts 113 and 114 being provided in the frame for conducting the fluid, slowly leaking through the labyrinth seals, into the space confined by the outer cover 115. The cooling air and the air flowing through the labyrinth seals is then conducted outside through ducts or port holes, not illustrated in the drawing.

The operation of the compressor is as follows: Compressible fluid, which may be air, enters opening 97 and then, at once, is drawn into a pre-compression stage 86—87—88—89 where it is imparted sufficient acceleration so as to attain Mach number of the order of 0.7 for the absolute velocity of the fluid at the exit from the prerotation stage. It is then centripetally compressed, with a substantially constant radial velocity, through all the stages, whereupon it reaches the ducts 101—102 and the outlet ducts 109 and 110. Compression ratios of the order of 12:1–15:1 are obtaintable with the disclosed compressor.

While it is desirable, for optimum operation and ease of construction, to rotate the two compressor rotors at the same revolutions per minute, it is possible to keep one of the compressor rotors stationary. A compressor of this type is disclosed in Figs. 4, 5, and 6. Also, the rotational speeds of the rotors need not be equal; however, when this is the case, the profiles of the airfoils in the two rotors may not be identical but will have to be shaped to conform with the respective rotational speeds of the two rotors. It is obvious from the above, that optimum operating conditions are obtainable only when the two rotational speeds are equal.

Figs. 4, 5, and 6 illustrate a centripetal compressor in which there is only one rotor, the second "rotor" in this compressor being stationary. In view of the previously given description of the compressor with two rotors, the description of the single rotor compressor may be relatively brief, since the rotors in both cases are identical and the only difference between the two types of compressors resides in the stationary stages of the compressor which now perform only one function, namely to change the direction of flow of the air streams between the successive stages of the rotor so that the angle of incidence of the air velocity vector would conform with the fluid dynamics principles utilized in the disclosed compressors.

Referring to Figs. 4, 5, and 6, and especially Fig. 4, a solid shaft 400 is connected to any prime mover on one side and to a side disc on the other side. The side disc 402, the expansion hoops 403 through 407, and rings 408 through 417 are identical to the same elements in the compressor illustrated in Figs. 1 through 3. The same is true of the compressor blades 500 through 504, etc., Fig. 5, which are mounted between the rings, namely, they are airfoils of a highly cambered profile, which are discussed below and illustrated more in detail in Fig. 8.

The stationary blades 450 through 457 of the compressor are supported on one side by a frame 424 and rings 460 through 463 and on the other side by rings 425 through 428, these rings, in their shape and function, corresponding to the rotating rings 413 through 417. The compressor is also provided with the prerotation stage 430 supported by frame 424. The compressor is surrounded by a scroll 432 which supplies the compressor with air, if air is the compressible fluid to be compressed. The central chamber 434 of the compressor is connected to an outgoing duct 436, which is connected to any consumer of the compressed air.

Because of the use of scroll 432, the shape of the prerotation stage blades is as illustrated in Fig. 6 at 612 and 614; the blades are straight air foils, and their function is primarily to impart to the incoming air a velocity having proper vectorial relationship with respect to the air foils 602, 604, 611, and 606 of the first stage of the compressor. The acceleration of the fluid is performed in this case primarily by scroll 432 and only minor degree of acceleration is obtained in the prerotation stage. The stationary blades 600 and 601 have the shape of a constant velocity cascade through which the incoming air is only turned to be in an approximately tangential relationship with respect to the succeeding compression stage of the compressor. The fluid dynamics and thermodynamics of this compressor, in its compression stages, are identical to those of the contrarotating compressor and, therefore, will not be discussed here. The description of the compression stages of the contrarotating compressor is given below and constitutes a part of the description of the single rotation compression stages.

Fig. 6 illustrates a single stator turning stage 610. The blades 600 and 601 of this stage form a substantially constant velocity channel 603, the function of which is to turn the absolute velocity vector $C_2$ so that it is in the direction of the absolute velocity vector $C_3$, the direction of which forms a proper angle $\alpha_3$ with the tangent 605 to the inner periphery 607 of the stator stage 610. This angle is adjusted to form a proper entry angle $\beta_3$ for the relative velocity $W_3$ into a compression channel 609 of the succeeding compression stage 2. Since the velocity diagrams are discussed more in detail in connection with the contra-rotating compressor, no further discussion of these vectors will be given here.

*Fluid dynamics and thermodynamics of the centripetal compressor*

In any rotary compressors having continuous compression cycle, as differentiated from intermittent cycle (reciprocating compressors), the only way the process of compression can be accomplished is by first accelerating an elastic fluid to as high a velocity as possible to obtain as high a kinetic energy as possible and then converting or transforming this kinetic energy into a potential energy (pressure). The above statement leads one to an immediate conclusion that the higher is the velocity of the accelerated air (if air is the fluid medium) the higher will be the final pressure obtained with the compressor. This being the case, the next logical question is whether there is any practical limit to this velocity. Such absolute limit does exist, and it is within the supersonic velocity range. Supersonic velocity centripetal compressor is disclosed in the pending application of Vladimir H. Pavlecka, filed on March 24, 1951, and having a Serial No. 217,347, where it is stated that the absolute velocity limit is determined by the ability of the compressor to cross successfully the boundary between the subsonic and supersonic regions. As also stated in the above application, the optimum performance characteristics are obtainable only at substantially constant speed of rotation. In some applications it is desirable to operate the compressors at variable speed, and when this is the case, then it becomes more advantageous to use subsonic compressors whose characteristics, and especially the airfoils, permit their operation at variable speeds without materially affecting their efficiency. This invention discloses a subsonic compressor.

Whether the compressors are of subsonic or of supersonic type, it is obvious that optimum performance characteristics are obtainable only when applicable laws of fluid dynamics and thermodynamics are observed at every step.

The analysis and a more detailed description of the structure of the compressor will be presented by first discussing the flow channel configurations (Figs. 7, 8, 9, and 15) in the prerotation stage and between two airfoil blades in the compression stage which are capable of satisfying completely the necessary vector relationships between all the entry and exit velocity vectors without any aerodynamic discontinuity throughout the length of the flow channels; the optimum angle of turning of the air flow and maximum compressibilities are also discussed in connection with Fig. 8.

This will be followed with the determination of the potential flow field (Fig. 8) to demonstrate that the previously selected parameters satisfy in every respect the laws of fluid dynamics.

Description of the airflow channels will be followed with the description of the velocity vector diagrams (Figs. 10, 11, and 12) throughout the compressor which determine the relationships between the configurations of the mechanical components within the compressor and the laws of fluid dynamics and thermodynamics which must be observed and which control the possible mechanical configurations with the accepted basic geometry of the centripetal compressor. These velocity vector diagrams determine all the air flows and the concomitant fluid dynamic and thermodynamic characteristics of the overall combination. Moreover, these diagrams also determine the shape of the airfoils which are able to function best within the limits of the vectors.

The same principles of analysis will be given for the flow channel form of the compressor in a plane passing through the axis of rotation of the compressor (Figs. 9 and 16), the analysis of the flow channels given in connection with Figs. 7 and 8 being in a plane normal to the axis of rotation.

*Prerotation stage of the centripetal compressor*

Prerotation stage of any dynamic compressor must expand the ambient air pressure to a sub-atmospheric pressure thereby accelerating the stationary ambient air mass to a velocity whose vector is acceptable to the first stage of the compressor. The relative entry velocity, into the first stage, which is known in the art as velocity $W_1$, should be as high as possible. However, practical limitations of fluid dynamics in subsonic region, where Mach number must be considered since it is one of the limiting factors, prevent the assignment to this velocity of a value equal to or in excess of the velocity of sound due to the rounded configuration of the leading edges of the airfoil blades. Therefore, the maximum values of $W_1$ currently attainable have Mach numbers of the order of 0.8 in axial compressors, and 0.95 in one known centrifugal compressor having sharp entry edges (compressor of the De Havilland "Ghost" jet engine), well known to those skilled in the art. In the disclosed centripetal compressor the relative velocity ($W_1$) Mach numbers can reach maximum values of the order of 0.9 and 0.95 with rounded entry edges. Therefore, the configuration of the entry channel, which is the channel defined by the surface of the prerotation blade 704 and by the surface of the identical blade 707, must have a pre-acceleration region for gradual acceleration of the air mass crossing the plane defined by the outer periphery of the prerotation stage, and then the acceleration region which enables the fluid to reach the maximum relative velocity having a Mach number of the order of 0.9 to 0.95 at the entry to the first compression stage. The pre-acceleration region is necessary to avoid, in the first half of the entry region, excessive friction losses because of large area exposed to the flow, and secondly, to avoid flow separation in the intermediate region of the channel where maximum turning of the flow occurs and where it blends into the accelerating channel proper.

The blades, therefore, assume the shape of sharply curved airfoils which begin with a circular leading edge 708 having a radius 709 whose center is positioned on a radius 710 of the entire compressor circle 711. The magnitude of this radius 709 is not critical and is primarily dictated, first, by the ability of the cylindrical surface to divide the air flow equally into each channel, and secondly, by the avoidance of flow separation in the process, the latter consideration setting the maximum length that can be assigned to radius 709.

The cylindrical leading edge 708 of the airfoil then blends into two sloping planes 712 and 713 on the opposite sides of the cylindrical leading edge, these planes forming two equal angles, 714 and 715 with radius line 710. The magnitude of these angles is of the order of 8° to 12°. The left side of the airfoil, as viewed in Fig. 7, then blends into a circle 706 having a radius 716 whose magnitude is not especially critical and is primarily determined by the rate of the pre-acceleration desired in the pre-acceleration region of the flow channel, its minimum value being determined on the other hand by the prevention of harmful encroachment of the pre-acceleration region upon the acceleration region itself and distortion, involving losses, of the blending region between the pre-acceleration and acceleration regions. The inner end of the arc produced by radius 716 then forms a tangent connection with a straight line 717, the latter terminating in a semi-circular trailing tip 718, having a radius 724, of the airfoil.

The straight line portion 717 forms an angle 719 with line 720, the value of this angle being from 2 to 5 degrees, the optimum angle being of the order of 3°. Line 720 is parallel to line 721, line 721 being a perpendicular passing through the center of line 722. Line 722 is normal to line 720 and also to the convex surface of blade 704. Line 722 represents the minimum width of the entire flow channel and also the minimum width of the acceleration region. Point 723 represents an intersection of line 722 with the junction point of the lines 717, 720, and semi-circle 718. It is seen from the above that the minimum width of the acceleration region is at the inner end of the concave profile of the airfoil. It is necessary to terminate the airfoil with the finite radius 724 to avoid structural weakness of a thin trailing edge and also to avoid supersonic bending of the outflowing stream and the concomitant angular deflection of the entire airstream in a counter-clockwise direction from its intended axis 721. It may be shown that such deviation, existing in the cascades of the prior art, and currently used in turbines, produces decrease in the overall efficiency of the expansion cascades, of the order of 3%.

The convex surface of the airfoil consists, as stated previously, of cylindrical surface 708, flat surface 713, a cylindrical surface 727 having a radius 725, and a cylindrical surface 728 having a long radius 726, the center of which is beyond the boundary of the drawing. Cylindrical surface 727 must be proportioned with greater care than any other surface since it may otherwise produce flow separation and the concomitant turbulence, this turbulence constricting the channel dimensions at its most critical point. The cylindrical surface 727 is the so-called flow-accelerating surface, since it has a pronounced convex curvature, and this has a tendency to produce a vacuum next to this surface with the result that the air stream accelerates in the direction of the curvature. All that is necessary here is to avoid excessive curvature which would at once produce separation between the stream and the surface, and the resulting turbulence. The magnitude of radius 725, therefore, is a function of the absolute air velocity. The determination of such surfaces is known to the prior art. Arc 728 meets arc 727 at point 729, which is the point at which line 722 is perpendicular to a tangent 730 which passes through point 729. The configuration of the flow channel is such that tangent 730 is parallel to the axis 721, which is the axis of the flow channel. In the prior turbine art, the surface 728 of the air foil follows tangent 730 and the lower portion of the semi-cylindrical tip 718 is tangent to the tangent 730. Stated differently, the channel wall 728 becomes identical with tangent 730, and therefore is parallel to the direction of the air stream. Because of such configuration, the air stream, not being supported any longer by the trailing surfaces 717 and 717 of the adjacent blade, is deflected downwardly around the tip 718 and such deflection of the air stream carries along with it the entire air stream. Accordingly, the air stream does not follow axis 721. Such deviation of the air stream produces a wrong angle of incidence on the following rotor, which is larger than the calculated optimum angle, which constitutes the second contributing factor to the 3% efficiency loss described previously in connection with the trailing tip 718. Curving of surface 728 produces an accelerating surface which counteracts the drooping effect produced by the trailing tip, and thus restores the direction of the air stream to its intended coincidence with axis 721.

The absolute velocities of the fluid, indicated in Fig. 7, are $C_0$ and $C_1$. $C_0$ is the low entry velocity, while $C_1$ is a high exit velocity whose magnitude is determined by the effectiveness of the first compression stage to create as low a pressure as possible within the air-gap between the two stages. As stated before, the maximum value of $C_1$ is of the order of 0.7 of the local Mach number.

From the description given thus far, it follows that in order to obtain maximum efficiency in the prerotation stage, the stage should have first the preacceleration region which blends into the acceleration region, the flow channel converging gradually through the preacceleration region. Since the acceleration rate is a function of the width of the channel, graphical presentation of the change in width plotted against the length of the channel will demonstrate, in graphical form, the acceleration rates, or the manner in which the fluid is accelerated in the prerotation stage channel. Such curve appears in Fig. 15. This curve is obtained as follows: Taking line 722 as a starting point, for example, line 722 is taken as a diameter for circle 732 which is tangent to the adjacent blades at points 723 and 729. Similar circles are inscribed into the flow channel with the centers preferably spaced equidistantly from each other. The line connecting the centers of all the circles is line 721, and this line is the median line of the channel in the plane perpendicular to the axis of rotation. The distance between the circles is then plotted along the ordinate in Fig. 15 and the obtained points on the ordinate are then used to inscribe a plurality of arcs whose radii are equal to the radii of the respective circles illustrated in Fig. 7. Curve 1500 is then drawn as an envelope curve to all the arcs drawn previously. The abscissas for the points on this curve are equal to the width of the flow channel divided by two, and the changes in the lengths of these abscissas represent the changes in the accelerations throughout the channel. Examination of curve 1500 discloses that the acceleration changes are very gradual from point 1 to point 7, are at a maximum from point 7 to point 11, and again rather small from point 11 to point 13, the last portion of the channel thus acting primarily as the flow-directing channel. Since the length of the ordinate from point 1 to point 13 represents the actual length of the flow channel of the precompression stage, and since the friction between fluid and the walls of the channel is a function of the velocity, it follows that the shorter is the high velocity region, the smaller will be the loss due to friction. The disclosed channel avoids sudden dimensional changes in the width of the channel to avoid flow separations, and at the same time the dimensional changes were made as abruptly as is possible without producing separations. Thus, the main acceleration region has been restricted to the length equal to the distance between the points 7 and 10 in Fig. 15, which means that relatively high frictional losses are produced in less than one-half of the length of the flow channel.

*Compressor rotor stage*

The accelerated fluid leaves the prerotation stage with the absolute velocity $C_1$, which has been discussed in connection with Fig. 7. The same absolute velocity also appears in Fig. 8, which illustrates the transverse cross-sectional view of two typical compressor airfoils 800 and 801 taken in a plane perpendicular to the axis of rotation. As indicated in Fig. 8, the rotational velocity of the outer periphery 802 of the compressor stage vectorially is equal to $U_1$. Therefore, the relative velocity of the air stream with respect to the periphery 802 can be represented by a vector $W_1$, the sum of the two vectors $U_1$ and $W_1$ producing the absolute velocity vector $C_1$.

To clarify the representations appearing in Fig. 8, it becomes necessary to digress for a moment and explain the meaning of some of the lines appearing in Fig. 8. The inner periphery of the prerotation stage is indicated at 701, meaning that a radial air-gap indicated by an arrow 803 exists between the prerotation stage and the first compression stage. The radial dimension of the air-gap is controlled by the diameter of the semi-circle 718 (trailing end of the prerotation stage blade) which produces a wake behind it. This wake disappears within 5 to 10 diameters of the semi-circle 718, and it is advantageous to make gap 803 sufficiently wide to allow for the complete disappearance of these exit wakes. This streamlines the air stream before it enters the first rotor.

It is obvious that such streamlining eliminates the losses which would have been present otherwise at the point of entry of the stream into the first stage. From the above, it follows that the radial width of gap 803 should be of the order of 3 to 8 times the diameter of the semi-circle 718.

The fluid dynamics which exist in the gap are controlled by the free vortex law, which is defined by the expression:

$$Cu_1 \cdot r_1 = \text{constant}$$

where $Cu_1$ = the projection of the absolute velocity $C_1$ on the tangent of a circle of radius $r_1$.
$r_1$ = the radius of periphery 802.

The effect of this is that the absolute velocity $C_1$ increases with the decrease of $r_1$, and angle $\alpha_1$, which is the angle between $C_1$ and the tangent, also increases with the decrease of radius $r_1$. Because of relatively small radial dimension of gap 803, this vectorial change in $C_1$ will be disregarded in this description, although it cannot be disregarded in actual practice.

In Fig. 8 there are indicated the potential flow stream lines 804 through 807 which illustrate the direction of flow only within the lower part of the gap. These lines represent the flow field, or the instantaneous direction of the relative velocity $W_1$ with respect to the first compression stage. The flow lines 804 through 807 are slightly distorted because of the presence of the convex curvature 830 of the airfoil 801. This distortion extends somewhat into the gap 803 since $W_1$ is less than the speed of sound and therefore the distortion has sufficient time to propagate itself into the gap and in the direction opposite to the direction of flow. This, in turn, will produce the deflection of $C_1$ toward the center of rotation. It is for this reason that the potential flow stream lines assume the form of free vortex having a mean radius $\rho$. The vector velocity diagram is taken at point 808 on the periphery 802 with respect to the mean streamline 805. Therefore, $W_1$ is tangent to streamline 805 at point 808.

It has been stated in the introductory part entitled "Fluid dynamics and thermodynamics of the centripetal compressor," that the basic principle of the compression phenomena consists of first accelerating the fluid mass to a high relative velocity and subsequently decelerating it by diffusion, thus converting the kinetic energy into pressure energy. From the above, and previous general discussion, it follows that $W_1$ must be as high as possible, and that in the disclosed subsonic compressor this velocity may be of the order of 0.9 to 0.95 of the local Mach number, i. e., Mach number at point 808 in this discussion. This number is a practicable limit for the compressor operating at variable speed in the subsonic region. This Mach number is the highest Mach number that is reached in the compressor and in all subsequent compression stages and interstage gaps the local Mach number will be progessively smaller.

Proceeding now with discussion of the fluid dynamics of the first compression stage, examination of the fluid potential field discloses that the potential line 809, which is at right angles to the convex surface of the airfoil blade 801 and passing through point 808, is the shortest potential line in the flow field, and thus represents the narrowest portion of the flow channel. Therefore, according to Bernoulli's principle, the velocity will be the greatest and the static pressure will be the least at this point. Progressing in the centripetal direction, along the mean stream line 805 and into the flow channel of the first stage of the compressor, the lengths of the potential lines 810, 811, 812, and 813 increase progressively, which means that the flow channel of the compressor, which begins in the region of the potential line 809 and terminates in the region of the potential line 812, widens progressively from potential line 809 to potential line 812. Such widening of the flow channel can produce only one result: the maximum kinetic energy reached at point 808 is converted gradually into potential energy throughout the channel length. The vector diagram of the flow stream at a point 816, which lies at the intersection of the mean stream line 805 with the inner periphery line 818, consists of a relative exit velocity $W_2$, peripheral velocity $U_2$, and the absolute velocity $C_2$, which is the sum of $W_2$ and $U_2$. Comparison of the vectors at the points 808 and 816 reveals that $W_1 > W_2$; $U_1 > U_2$; and in the illustrated example $C_1 > C_2$, all of the above vectors being determined primarily by the dimensions of the flow channel, by the equations of state for the fluid used, $$PV = RT \qquad (1)$$

and by the equation of continuity $$A_1 W_1 \gamma_1 = A_2 W_2 \gamma_2 \qquad (2)$$

where $P$=absolute pressure
$V$=absolute volume
$R$=gas constant
$T$=absolute temperature
$A_1$=cross-sectional area of the flow channel at potential plane 809
$W_1$=relative velocity across the plane 809
$\gamma_1$=density at plane 809 and the remaining terms, $A_2$, $W_2$, and $\gamma_2$, are the corresponding values at the potential plane 812.

The pressure and temperature at the potential plane 812 are derived from the equation of state ($PV=RT$) and from the entropy diagrams for the fluid under consideration. The obtained values of P and T are then introduced into the expressions for the density $\gamma$ and these in turn are substituted into the continuity equation from which the width of the flow channel at any interstage gap and the velocity vectors are determined.

From the description given thus far, it follows that the flow channel is defined—in the plane normal to the axis of rotation—by the circles 802, 818, and by curvilinear surfaces 820 and 822 of the airfoils 800 and 801. In an ideal centripetal compressor, it would be possible to have maximum relative velocity $W_1$ not at point 808, but at point 824, which is in the vicinity of midpoint of air gap 803. This velocity would then reach point 808 without any change, and—again having an idealized channel in mind—the diffusion and compression would start immediately on the inner side of the potential plane 809 and continue to potential plane 812 and beyond. The airfoils delimiting or defining such channel would have to have zero thickness and could not exert any force on air stream. Therefore, practical airfoils should have such fluid dynamic configuration as to have sufficient structural strength and rigidity, and at the same time have a profile which would produce minimum amount of acceleration on the flow stream. This type of airfoil is best approached by the airfoil derived by conformal transformation of a circle according to Joukovsky, well known to those skilled in the art. Joukovsky's airfoils are complex in form and difficult to fabricate. Accordingly, a better all-way-around airfoil is obtained by using a simple circle. Beginning with the cylindrical leading edge 826, it has a radius 828 which is proportioned to introduce minimum amount of disturbance in the flow stream as it enters the flow channel at the potential flow plane 810. From this point of view, this radius should be as small as mechanically possible and, as stated previously, in the theoretical case, and for fixed speed of rotation, it should be equal to zero, i. e., the leading edge becomes razor sharp. As also stated previously, the subsonic compressor, which is under the discussion here, has its justification in that it is capable of maintaining high efficiency over a wide range of rotational speed so long as the leading edge 826 is sufficiently blunt (large radius) to avoid flow separation at its tip. This being the case, the practical leading edge is a compromise, the limit of which nevertheless should be carefully observed, this limit being set by the flow separation. The main convex surface of the airfoil preferably is composed of two circular surfaces 830 and 832, having respective radii 835 and 836 whose centers lie on a common line 837, this line being readily obtainable by drawing a line perpendicular to the common tangent of both circles at the point where the two circles meet each other. The concave surface 820 is a single circular surface extending from the leading to the trailing tip, its length being indicated by a line 834. Its radius 838 is selected to produce a continuously diverging flow channel. The trailing tip 840 has a small finite radius to give the trailing tip sufficient mechanical rigidity without producing unduly wide wake at exit periphery 818.

The flow channel of the compression stage has been defined thus far in terms of the stream flow lines 804, 805, 806, and 807, potential flow lines 809, 810, 811 and 812, and in terms of the configuration of the airfoils or blades. It becomes desirable to summarize the full significance of all the terms and analysis of the performance of the compression stage by defining the physical significance of the parameters which spell out the successful and optimum performance of the compression stage. It has been stated before that the shortest potential flow line is line 809 which passes through point 808 determined by the intersection of the mean streamline 805 with the outer periphery 802 of the flow channel. At this point, the relative local velocity $W_1$ is maximum, this maximum being never exceeded anywhere else in the entire compressor. This is so because the width of the flow channel at the potential flow line 809 is at a minimum with respect to any other width in the compression stage. The above means that the potential flow line 809 thus defines the actual mechanical width of the flow channel at the plane of entry into the flow channel. The same is true of the potential flow line 812 which defines the maximum width of the flow channel at the exit of the compression stage. The above minimum and maximum widths are in a plane perpendicular to the axis of rotation. It is the ratio of these widths that determines the degree of diffusion and, therefore, the amount of compression obtainable in any given compression stage of the compressor. The same limits of the obtainable compression may also be defined by the degree of diffusion obtainable in the flow channel, this degree of diffusion being defined by the same ratio.

Examination of Fig. 8 and similar figures (if they were to be drawn in order to demonstrate the practical limits) in terms of maximum obtainable compressions, reveals that this maximum limit is of the order of 2 to 1 in the subsonic compressor. It is obvious that it would be useless to include in the above limit a minimum value, since such value would mean making a compressor as inefficient as possible and still have some output so that it could be called a compressor. The futility of such effort is apparent on the very face of it.

Thus far, the parameters and the performance characteristics of the compressor have been discussed in terms of the lengths of the potential flow lines 809 and 812. The channel obviously has three dimensions and thus defines a total volumetric displacement for any given channel, which is composed of the progressively increasing volumetric increments as one progresses from the entry to the exit of the channel. It goes without saying that the channel must have sides or side restrictions at the sides or ends of the blades.

Subsequent discussion of the channel sides (Figs. 9 and 16) will reveal, however, that the performance characteristics of the channel may best be expressed by the above ratio since it is best if the sides of the channel are given a configuration which makes them not instrumen in the diffusion and compression of the fluid undergoing the compression cycle.

Although the channel characteristics have been defined quite fully already, the same conclusions may be arrived at by following a somewhat different analysis, which is based on the so-called "angle of turning," the term well known in the art relating to axial flow-machines, and which could be borrowed for this use here. This angle is equal to angle $\delta$, which is the angle formed by the potential flow lines 809 and 812. The significance of this angle in the axial flow turbines is that it indicates the degree of energy conversion per stage. In cascade compressors, this angle indicates the degree of compression obtainable in a single stage, the greater the angle, the greater the compression per stage. Since, in the prior discussion, the amount of obtainable compression ratio has been defined in terms of the ratio of the potential flow lines 812 and 809, it would be only logical to expect that the significance of the value of this angle and of the above ratio is the same. This is indeed the case, since the geometry of the entire compression stage is such that the increase in this angle produces a corresponding increase in the above ratio, i. e., in the width of the flow channel. In the centripetal compressors disclosed here, this angle may have a maximum of the order of 50°. With the relative velocity $W_1$ being fixed, it is obvious that this angle determines not only the "Merit number" of the stage, sometimes known also as the pressure coefficient $\psi$, which will be defined later (it expresses the degree of compression per stage) but also the number of stages necessary for obtaining the total compression ratio of the entire compressor. Thus, the angle of turning is important not only from the point of view of the merit number, but it is equally important from the point of view of the "specific weight" of the compressor, which may be defined as the ratio of the total weight of the compressor to the volumetric flow of the compressed gas per second. Needless to say, this angle will also have a profound effect on the cost of the compressor. One of the reasons why the turning angle may have the value which is as large as 50° is because the airfoils in the disclosed centripetal compressors are turned so as to meet the incoming stream directly with their leading edges and the main surfaces of the airfoils then digress from the natural lines of vortex only to the extent necessary to produce maximum amount of compression without producing flow separations and wakes. Thus, the compression stage can be turned through a very large initial angle so as to meet the already precurved gas stream, this angle being equal to the angle of free vortex curve, this angle being formed by a potential flow line perpendicular to the free vortex curve at the point of entry and a similar potential flow line at the exit from the stage. If this angle, which does not appear in Fig. 8, is called angle $\delta_1$, the entire angle of turning, angle $\delta$, is greater than angle $\delta_1$, since the compression configuration of the flow channel turns the free vortex lines even more than in the natural free vortex.

Uniform free vortex approach at the entry into the compression channel around its periphery, and generation of another free vortex at the exit of the same channel, thus aids to obtain compression in the centripetal manner and, therefore, the design of the entire compressor is not beset with the problem of continuously "fighting" the natural laws of flow, which is the case in the existing dynamic compressors, i.e., axial and centrifugal compressors. Because of this inherent disadvantage of the dynamic compressors known to the prior art, the maximum angle of turning in the axial flow compressors is limited to 28°, and even then this angle of 28° can be attained only at the root of the blade section. It means that any subsonic axial compressor must have a large number of stages, and it is not uncommon in the subsonic axial compressors, having as low a compression ratio as 4.5, to have 11 stages for obtaining this ratio, which makes the overall length of such compressor of the order of 5 feet. It is obvious that, considering the number of stages, and the inherent complexity of the geometry of the entire compressor, such as twisted blades, it is not difficult to comprehend the enormous costs and the upkeep difficulties connected with such compressors. While no direct comparison may be drawn between centripetal compressor and centrifugal compressor in terms of turning angles, since no turning angle exists in the centrifugal compressors, it may, nevertheless, be stated that staging of the centrifugal compressors represents almost an insurmountable difficulty from the point of view of fluid dynamics and the delivery of the finally compressed fluid along the axis of rotation. This can be accomplished only by resorting to a 360° turn, which cannot be accomplished without losses.

The previously mentioned turning of the airfoils in the direction of free vortex may be expressed by an angle $\beta_1$, between $W_1$ and $U_1$, which angle may be called a scooping angle of the compression stage in a centripetal compressor. The significance of this angle resides in the fact that it determines the length of the diffusion channel; the smaller the angle, the longer the diffusion channel. This angle may have a minimum value of the order of 9° in the centripetal compressor, while it is of the order of 20° (mean angle) in axial compressors. The length of the flow channel may be defined as the length of the mean stream line 805 between the points 808 and 816. The longer is the flow channel, the larger is the degree of divergence that may be obtained, or, stated again in terms of the ratio of the potential flow line 812 to line 809, the greater is the length of the flow channel, the greater is the potential flow line ratio.

*Profile of the centripetal compressors in a plane passing through the axis of rotation*

Thus far, the configuration of the compressor prerotation stage and of the compression stages has been discussed with respect to the plane normal to the axis of rotation. The same will be discussed with respect to the plane which passes through the axis of rotation. The configuration of the entire compressor in this plane appears in Fig. 1 and also, on an enlarged scale, in Figs. 2 and 9, for the contra-rotating compressor, and in Fig. 4 for the compressor which has one disc, disc 424, stationary and the other disc, disc 402 rotating. For convenient differentiation between the two types of compressors, the contra-rotating compressor will also be called here as the compressor having double-rotation, and the other as a single-rotation compressor. The longitudinal section of the double-rotation compressor will be described first.

In analyzing the compression stage, its functions, and the laws of fluid dynamics and thermodynamics, entirely novel methods have been used here, which are as follows: The configuration of the flow channel from the potential flow line 809 to line 812, Fig. 8, is determined in the manner described in connection with Fig. 8. As stated in connection with the description of Fig. 8, maximum obtainable diffusion is the goal that one strives to achieve in analyzing the entire profile of the flow channel. The obtained compression produces the concomitant changes in temperature, density, specific volume and pressure in the compressed fluid. The above values determine the thermodynamic state of the fluid in accordance with the equation of state ($PV=RT$) and, since the transverse section (Fig. 8) of each compression stage is dimensioned primarily for obtaining maximum degree of compression rather than its strict compliance with the equation of state, it becomes necessary to adjust the overall volumetric characteristics of the flow channel in the planes perpendicular to the axis of rotation, i. e., by adjusting the shapes of the side rings 51 through 73, Fig. 2, and the axial dimensions between the rings in each stage. Thus, this volumetric adjustment is produced without unnecessarily burdening the transverse section with such correction, which would be in direct opposition to what one strives to accomplish in the flow channel. Stated more succinctly, there is a necessity of obtaining as large a ratio of 812 divided by 809 as possible to obtain maximum diffusion; yet, the volumetric correction would call for the decrease in this ratio, which obviously either would reduce or completely stop the diffusion, and thus stop the entire cycle of compression. From what has been stated about the vectorial velocities of the compressible fluid in the transverse plane, i. e., the plane illustrated in Fig. 8, it follows that in the centripetal compressors the compression is accomplished by varying the magnitudes of these vectors in this transverse plane only, and this flow does not have any operating component in the axial plane. Thus, the entire compression cycle is based upon the variation of the velocity components in a single plane, i. e., say, X–Y plane, which is the plane illustrated in Fig. 8. This type of compression cycle may be called the two-dimensional compression method as differentiated from the three-dimensional compression method currently used in axial and centrifugal compressors. The above follows at once from the very geometry of the compressors, the centripetal compressor having neither the blade twist nor the change in the airfoil profile, while the centrifugal and axial compressors have both. Thus, in any two-dimensional compressor the volumetric correction cannot be made in the transverse plane (Fig. 8) and the width of the flow channel cannot be made uniform since this at once would destroy the obtained compression by removing the necessary side-support for the compressed fluid.

In view of the above, all volumetric corrections must be introduced in the longitudinal plane. These corrections are illustrated quite clearly for the entire channel in Fig. 1, where the width of the flow channel begins to narrow even within the prerotation stage. It is to be noted here that narrowing of the prerotation stage is done to make its volume conform with the accelerated velocity rather than for obtaining any compression since it is obvious that in this stage the exit pressure is always less than ambient. From then on, however, narrowing of the width of the channel up to its mid-portion, in the illustrated example up to and including the seventh stage (see Figs. 1 and 9) is done because of the compression of the fluid and the necessity of continuously adjusting the volume of the channel to the continuously changing state of the fluid as defined by the state equation and the equation of continuity. Beyond stage 7, the channel begins to widen until it finally reaches the central chamber. The channel must be made wider as one approaches the axis of rotation because the volumetric displacement of the last stages diminishes with such progressive rapidity with the decrease of their radii that it becomes necessary to counteract this accelerated decrease in volume by widening the channel width. The shape of the resulting curve in the upper part of the channel approaches a parabola, and it then becomes first almost hyperbolic and then strictly hyperbolic where it makes a turn at the entry of the channel into the hollow part of the shaft.

Beginning with the description of the profile of the prerotation stage, this profile from point 900 to point 901 is controlled primarily by the profile of the compression stages, since profile 900–901 represents in the main a smooth continuation of the main compression flow channel. The main overall dimension of the first compression stage 1, namely its radial dimension 902 and its axial width 904 at the point of entry are determined by the desired capacity of the compressor, and from then on the profile of the side walls of the entire compression channel from line 905 to line 906 (see stage #12) is determined by the previously mentioned state and continuity equations, the radial inflow velocity, and decrease in the available volume as one progresses in the radial direction. This profile is represented by a dotted line 908, and, as mentioned previously, the width of the channel diminishes up to stage 7, and then widens from then on. The converging portion of the profile from point 900 to approximately a point 910, on the converging portion of the curve, approaches a parabola. The remaining diverging portion of the curve approaches a hyperbola from 910 to 912, and from point 912 to point 914 it is a hyperbola. The radial component $C_r$ of the exit velocity $C_s$ from the last stage, is relatively small as compared to $C_s$. In order to make the diameter 916 of the ducts in the hollow shafts 18 and 20, Fig. 1, as small as possible, it becomes desirable to make $C_a$, the axial velocity, as high as possible without reaching the absolute maximum limit of flow in a constant diameter channel, which corresponds to Mach number 1. Mach number 0.8 to 0.9 is a feasible practical limit. The actual shape of the volumetric correction curve, to a large extent, is a function of the number of stages used in the compressor, any increase in the number of stages flattening out the curve, and vice versa. The curve also flattens out with the decrease of the flow capacity of the compressor since the axial dimension of the compressor becomes so small that only small volumetric correction is required, but it is never equal to zero in a practical compressor. It becomes equal to zero only when the capacity of the compressor becomes equal to zero, which is only a logical theoretical conclusion. The dotted line 908 is a theoretically correct boundary defining the volumetric correction. In practice, this line must be defined by the inner surfaces of the hoop rings 51 through 62 on one side, illustrated in Fig. 9 (see also Fig. 16), and by the hoop rings 63 through 73 on the other side, which are illustrated in Fig. 2. Since any surface introduces friction, it becomes necessary to make proper allowances for the boundary layer which is induced by the frictional flow of the fluid with respect to the walls of the channels, line 908 representing the boundary of the channel with the viscosity of the fluid being equal to zero. From the above, it follows that the higher is the viscosity coefficient, the larger is the correction which must be introduced for obtaining the desired effective width of the channel. This correction is denoted by a dashed line 918, Figs. 9 and 16, the spacing between line 908 and 918 being equal to the local thickness of the friction boundary layer at any given point. This spacing is not constant, but increases from point 901 to point 910 and decreases to point 914. The increase from point 901 to point 910 is due to the constantly increasing pressure and a corresponding increase in friction between the fluid and the side walls of the channel, this increase in friction producing an increase in the thickness of the boundary layer by producing centrifugal acceleration of the fluid at the point of contact between the fluid and the rotating side wall. This centrifugal acceleration is greater than the opposing centripetal acceleration because contour 908 is of decelerating type up to point 910. From then on there is a decrease in the thickness of the boundary layer because of the accelerating nature of the profile of curve 908 from point 910 to point 914. Therefore, from point 910 on, the centripetal acceleration overrides the thickening effect of the centrifugal acceleration which becomes progressively smaller, as one progresses radially inward. There is a marked decrease in the centrifugal acceleration because of the decreases in surface areas, in relative velocities $W$'s and in peripheral velocities $U$'s as the radius of the compression stages gets shorter. This progressive decrease in the thickness of the boundary layer continues even into the region of the hollow duct 916 (its diameter) because of the increase in the absolute velocity $C_a$, which produces a marked increase in the Reynolds number ($Re$) far into the turbulent region of flow with correspondingly low coefficients of friction.

The above described phenomena of progressively decreasing thickness of the boundary layer beyond the region of point 910 toward the axis of rotation is not a mere matter of greater efficiency, although it definitely contributes to the higher efficiency. It affects the very fluid dynamics of the compressor, and therefore must be considered in arriving at the operable compression cycle. Thus, in axial and centrifugal compressors, where the boundary layer becomes progressively thicker in the succeeding stages of the axial compressor and with the increasing radius of the centrifugal compressor, it is a matter of established experimental incontrovertible fact that these boundary layers had rendered some of the compressors completely inoperative. The axial and the centrifugal compressors which are operative solve this problem by means of first very poor but inescapable compromises, i. e., an increase in the width of the channel to the extent which materially impairs the efficiency of the compressor (even then the velocity diagrams are completely out of balance with the angles of the flow channels) and second, by having very low compression ratios, the maximum compression ratios obtainable being of the order 4.5 as compared to 8 to 15 reached with the compressor illustrated in Fig. 2 when the velocity vector relationship illustrated in Figs. 10 and 11 is used.

The contour line 918 does not represent the actual contour of the walls of the rings 51 through 62 since the actual wall surfaces incorporate additional corrections for reducing the thickness of the boundary layer. The above is accomplished by tilting the surface slopes in the counter-clockwise direction as viewed in Figs. 9 and 16. Taking a surface 920 of the 3rd stage as an example, this surface is tilted counter-clockwise around a point 929 which, in this particular case, is approximately midway between the outer edge line 924 and the lower edge line 926. The most convenient way of describing this tilt is by specifying the angle of tilt, angle $\theta$ (see Fig. 16), which is of the order of 1° to 5°, the optimum angle being of the order of 3°. Examination of the created profile reveals that the boundary channel, as represented by the spacing between the boundary contours 908 and 918, is made narrower at the inner part, i. e., next to the inner edge 926 of the hoop ring 57, and wider at the outer part next to the outer edge 924 of the same ring. Thus the narrowed part represents the region of maximum radial velocity in the boundary layer, which will reduce its thickness, and the wider region acts as a funnel with respect to the inflowing boundary layer from the preceding acceleration region of the preceding stage in the plane perpendicular to the axis of rotation.

It should be noted here that angle $\theta$ is not constant for all stages but varies from stage to stage, being least for the outer and inner stages, and maximum in the intermediate stage. This follows from the slope of curve 918 with respect to the central axis 928 of the entire compression channel.

The funnel type of construction of the side walls has an additional purely accidental advantage, which is not in the realm of fluid dynamics, but in the realm of ease of construction. If the channel surfaces of the hoop rings had to follow strictly contour line 918, the mechanical tolerances would have to be most exacting for realizing perfect alignment of all the surfaces in the axial direction, i. e., in the direction of the axis of rotation 930. Because of the funnel type of construction, the mechanical tolerances for obtaining workable axial alignment of all stages becomes much more liberal since the axial dimension 932, which represents the amount of funnel overlap, is not a very critical dimension.

*Velocity vector diagrams of the compressor stages*

It has been stated in connection with Figs. 7 and 8 that the compressible fluid enters the prerotation stage with the velocity $C_0$ and leaves this stage with the velocity $C_1$, both of these velocities being absolute velocities. The fluid then enters the first stage with the absolute velocity $C_1$ and, because of the rotation of the first stage with the peripheral velocity $U_1$, the actual velocity of the fluid with respect to the flow channel of the first stage becomes the relative velocity $W_1$, which is the velocity with which the fluid enters the first flow channel. This is represented by the vector diagrams in Figs. 8, 11, and 12.

In order to simplify the vectorial presentations of all the velocities in all compressor stages, these velocity diagrams have been taken along a radial line 1001 illustrated in Fig. 10. This enables one to make all peripheral velocities $U_s$, parallel to each other and position all vector diagrams along one radial line 1001, which also appears in Figs. 11 and 12. Such presentation does not constitute an approximation, but corresponds to a physical analogy if the airfoils were made infinitely thin and infinite in number. Stated differently, the presence of the airfoils is disregarded without disregarding all the physical effects that they produce.

The first vector diagram in Fig. 11 thus has been taken at a point 1002. The angles formed by the vectors with respect to the tangent lines 1000 and 1020 are $\angle \alpha_1$ and $\angle \beta_1$ respectively, the first being the angle of the absolute velocity $C_1$, and the second being the angle of the relative velocity $W_1$. These angles were discussed in connection with the description of Figs. 7 and 8. The velocity diagram at the point of exit 1004 from the first compressor stage is represented by the vectors $W_2$, $U_2$, and $C_2$, and the velocity diagram for a point 1006 on the periphery of the second stage is represented by the vectors $C_3$, $W_3$, and $U_3$, the absolute velocity $C_3$ being substantially parallel and equal to the absolute velocity $C_2$. The corresponding angles angle $\beta_2$, angle $\alpha_2$, angle $\beta_3$, and angle $\alpha_3$ indicate the angular changes in the velocity vectors with respect to the tangent reference line. In terms of actual physical angles, the progressive increase in the angles $\alpha_s$ and $\beta_s$ with decrease in radius finds its counterpart in the progressively increasing pitch angle $\epsilon$, Fig. 10, which is an angle between the airfoil chord line 1010 and a tangent line at the point of the trailing edge of an airfoil. This angle roughly defines the slope of the mean flow line; in the disclosed compressor angle $\epsilon$ is inversely proportional to the respective radii of the compression stages.

The process of the vectorial presentations of the velocities and their angular relationships with respect to the radial line 1001 has been carried all the way through all the stages of the compressor illustrated in Figs. 1 and 2, with the final absolute exit velocity appearing as vector $C_{24}$. The complete symmetry of all vector diagrams with respect to line 1001 is apparent even from casual examination of Fig. 12, all vectors diminishing linearly with the decreasing radius of the compression stages, as indicated by the straight lines 1201, 1202, 1203, and 1204, all of these lines converging to a point 1205 which lies on the axis of rotation 1206. Line 1201 makes an angle $\Delta$ with line 1001 and line 1204 makes an angle $\Omega$ with line 1001, the two angles being equal to each other. The same is true of angle $\Phi$ and angle $\Gamma$, which are also equal to each other. The significance of the above symmetries in terms of the performance of the respective stages resides in the fact that all stages carry proportional loads, the absolute values of which are a function of the square of the radius of each stage. The above relationship follows from the application of the fundamental equation for an increment in mechanical head, derived from the Euler's equation for an increment in mechanical heads due to change of velocities in fluids. The general equation reads:

$$\Delta L = \frac{1}{g}(C_{u_1} U_1 - C_{u_2} U_2) \tag{3}$$

where $\Delta L$ is the mechanical head in $$\frac{\text{ft. lbs.}}{\text{lbs.}}$$

$g$ is acceleration due to gravity, feet/sec.²
$C_{u_1}$ is the absolute entry velocity vector projected upon the tangential direction, feet/sec.
$C_{u_2}$ is the absolute exit velocity vector projected upon the tangential direction, feet/sec.
$U_1$ is the peripheral velocity at the entry to the stage, feet/sec.

$U_2$ is the peripheral velocity at the exit of the stage, feet/sec.

It may be shown by differentiating Equation 3 for determining the maximum value of $\Delta L$, that this maximum value is obtained when $$C_{u_1} - C_{u_2} = U_2 \qquad (4)$$

Actual measurement of these vectors in Figs. 11 and 12 demonstrates that the vector diagrams do satisfy this equation.

The fact that all stages carry proportional loads, the absolute values of which are a function of the square of the radius of each stage, follows from Equation 3 which states that the mechanical head, $\Delta L$, is a function of the square of the radius since $C_u$ and $U$ are both functions of the radius.

From the relative magnitudes of the vectors in the first stage and the last stage, one may gain an impression that little is accomplished by the last stages of the compressor. Although $\Delta L$ is relatively small, the work done by these stages is fully in conformance and in proportion to their size so that, relatively speaking, they are as fully loaded as the first stages.

The vector diagrams in Fig. 12 disclose the fact that the projection of the absolute velocities $C$'s on the radial line 1001, identified as the radial velocity $C_r$ in Fig. 11, is substantially constant in all stages, which represents the optimum operating condition for all stages, primarily from the fluid dynamics point of view.

It should be pointed out here for the sake of accuracy that the head equation for the centripetal compressor has one additional term, if it is compared with Equation 3. For the centripetal compressor, the head equation, derived from the Euler's Equation 3, is as follows:

$$\Delta L = \frac{1}{g}\left\{C_{u_1}U_1 - C_{u_2}U_2 + \frac{1}{2}(C^2_{u_1} - C^2_{u_2})\right\} \qquad (5)$$

(centripetal)

where the meaning of the terms is the same as in Equation 3. The presence of this term, obviously, does not alter the conclusions relating to the centripetal compressors given above. Equation 5 merely states that in addition the head produced by the sum of the products of the two velocities (the $C_{u_1}U_1 - C_{u_2}U_2$ term), this head is made larger by an additional term, which is positive in value because $$C_{u_1} > C_{u_2}$$

*Geometric relationship between prerotation stage and compression stage*

It has been stated in connection with the discussion of the performance of a typical compression stage that maximum attainable compression ratio in the first compression stage is of the order of 2 to 1, and that compression ratios of the order of 12 to 1 are attainable with the twelve stage contra-rotating subsonic compressor.

One of the main factors contributing to the attainment of such high overall compression ratio resides in the fact that there is a very definite geometric, as well as fluid dynamic, relationship between the prerotation stage and the first compression stage, this relationship dictating the performance and the merit numbers that must be assigned to the remaining stages in order to carry out what has been started in the prerotation stage and the first compression stage to its logical conclusion. It is for this reason that the vector diagrams illustrated in Fig. 12 assume that perfect symmetry which is illustrated with the striking clarity in Fig. 12, i. e., note the lines 1201, 1202, 1203, and 1204, and the fact that angle $\Delta$ = angle $\Omega$, and angle $\Phi$ = angle $\Gamma$.

The above mentioned geometric relationship resides in the fact that the flow channel of the prerotation stage has a sharp bend to the right in Fig. 7, as viewed in the direction of flow. This bend, as stated previously, is defined by the radius 716 on the concave portion and by radius 725 on the convex portion of the blade. This is the beginning of the acceleration channel proper, and from then on the mean flow line 721 assumes the angle $\alpha$ which determines the angle of the absolute velocity $C_1$ with respect to the input portion of the compression channel in the first compression stage. As illustrated very clearly in Fig. 10, this velocity, together with the rotational velocity $U_1$ determine the vectorial position of the relative velocity $W_1$ with respect to the mean flow line 805 in Fig. 8, $W_1$ being parallel to line 805 at the point of entry. It means that the compressible fluid enters the first stage with the maximum velocity attained anywhere in the compressor and such entry is directly in line or in the direction of the open flow channel at the point of entry 808 into the first stage. Thus, the flow channel of the first stage becomes fully rammed in with the compressible fluid, and this ramming is then continued throughout the compressor. Maximum kinetic energy is used for supercharging the first compression stage, and the process is continued to the last stage with the diminishing kinetic energies but with the constantly increasing densities and pressures of the fluid.

The above is achieved by tilting the leading edges of all airfoils in the first stage in the direction of rotation and making the centers of the leading edges point into the acceleration channel of the prerotation stage. The above geometry is defined in terms of the first compression stage looking into the acceleration channel of the prerotation stage. The same may be also defined in terms of the trailing edges of the prerotation stage, which are sharply turned in the direction opposite to the direction of rotation of the first compression stage. This geometry produces the all important supercharging of the compressor with the compressible fluid. The prerotation stage obviously plays an important role in this process since without this stage it is impossible to obtain the all important kinetic energies and the local Mach number of the order of .9 to .95. The only theoretical substitute for the prerotation stage would be such high peripheral velocity of the compression stages which would exceed all possible mechanical stress limits of all known materials.

At the conclusion of the descriptions of the physical configuration of the disclosed compressors, it is fitting to mention, if only parenthetically, that attempts have been made by others to produce centripetal compressors. United States Patents 2,391,779 to Griffith, 2,357,778 to L. W. Beaven, 2,471,892 to N. C. Price, 1,644,565 to P. L. Crowe, and 1,748,979 to Gunderson purport to disclose centripetal compressors. None disclose acceleration channel in prerotation stage, volumetric correction and properly coordinated diffusion channels in the compression stages. It is obvious, in the light of the most exhaustive discussion of the laws of fluid dynamics and thermodynamics applicable to the centripetal compressors given here, that all of the above features are indispensible to produce an operative centripetal compressor.

*Appendix*

In discussing the performance characteristics of the entire compressor and individual compression stages, their performance has been defined in terms of merit number or the pressure coefficient $\psi$. The same coefficient is known also as the head coefficient. The equation for this coefficient is as follows:

$$\psi = \frac{2g\Delta H}{U_1^2} \qquad (6)$$

where $\psi$ is the non-dimensional head coefficient
$g$ is acceleration of gravity, $$\frac{\text{feet}}{\text{sec.}^2}$$

$\Delta H$ is the compression head in feet
$U_1$ is the peripheral velocity at the entry to the stage in feet/sec.

For centripetal contra-rotating compressor, the compression head can be expressed also by an equation:

$$\Delta H = \frac{W_1^2 - W_2^2}{2g} - \frac{U_1^2 - U_2^2}{2g} \quad (7)$$

where the terms have the definitions given previously in the specification.

The compression head $\Delta H$ can be expressed in terms of temperatures as follows:

$$A \Delta H = C_p(T_2 - T_1) \quad (8)$$
$$\text{mean}$$

where $A = \frac{1}{778}$; mechanical equivalent of heat $\frac{\text{B. t. u.}}{\text{ft. lbs.}}$ $T_1$ = temperature of gas at the inlet to the stage, °R.;
$T_2$ = temperature of gas at the outlet from the stage, °R.;
$C_p$ = mean specific heat at constant pressure between
mean $T_1$ and $T_2$; $\frac{\text{B. t. u.}}{\text{lbs.}}$ As stated previously, for optimum performance of the compressor $C_r$ = constant and $C_{u_2} - C_{u_1} = U_x$.

When these two relations are satisfied, the compression head produced by a single rotating stage may be expressed by $$\Delta H = \frac{U_1^2}{2g} + \frac{U_1 C_1 \cos \alpha_1}{g} \quad (9)$$

and the head coefficient, $\psi$, becomes $$\psi = \frac{1}{\lambda^2} + \frac{2 \cos \alpha_1}{\xi} \quad (10)$$

where $\lambda$ is $\frac{C}{U}$, or absolute velocity, $C_1$ divided by peripheral velocity, $U_1$ for the compression stage under consideration.

$\xi$ is $\frac{U_1}{U_2}$, $U_1$ and $U_2$ having been defined before.

The isentropic head coefficient, $\psi_0$ is:

$$\psi_0 = \frac{2g \Delta H_0}{U_1^2} = \eta \psi \quad (11)$$

where $\eta$ is the efficiency of the compression stage.
$\Delta H_0$ is the isentropic compression head in feet.

$\Delta H_0$ can be expressed in terms of the relative and peripheral velocities as follows:

$$\Delta H_0 = \frac{W_1^2 - (W_2^i)^2}{2g} - \frac{U_1^2 - U_2^2}{2g} \quad (12)$$

where $W_2^i$ is isentropic relative velocity at exit from the stage.

The increase in head, $\Delta H - \Delta H_0$, necessary to overcome the internal stage friction is the difference between Equation 7 and Equation 12:

$$\Delta H - \Delta H_0 = \frac{(W_2^i)^2 - W_2^2}{2g} \quad (13)$$

this head difference designating the amount of energy converted into heat by friction while raising the pressure from $p_1$ to $p_2$.

Designating by $\varphi$ the velocity ratio $$\frac{W_2}{W_2^i}$$

and substituting this into Equation 13, the latter becomes:

$$\Delta H - \Delta H_0 = \frac{W_2^2}{2g}\left(\frac{1}{\varphi^2} - 1\right) \quad (14)$$

and, if $$\varphi = \frac{1}{\varphi^2} - 1$$

then, from Equations 10, 11 and 14, one obtains $$\eta = \frac{1}{1 + \frac{\varphi}{\psi_0 \xi^2}} \quad (15)$$

From this equation it follows that the higher the head coefficient and the higher the peripheral velocity, the higher will be the efficiency of the compressor. Thus, for a centripetal compressor, the most important stages have the highest efficiency.

Figure 13:
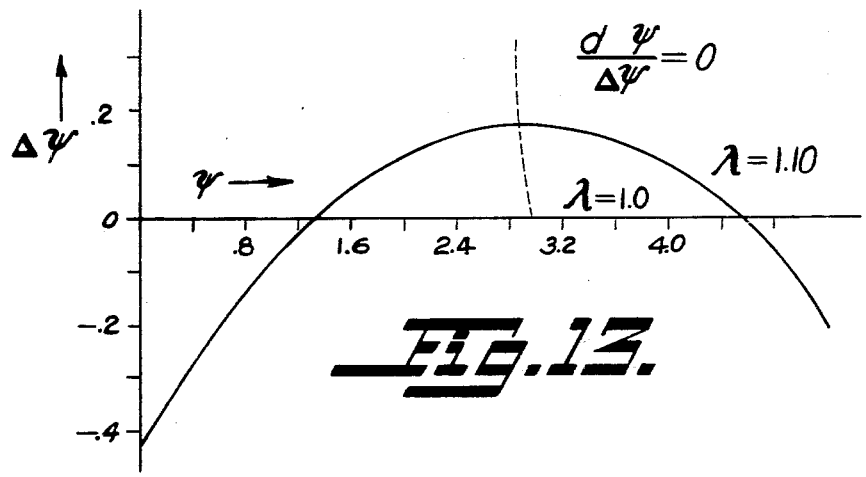
Fig. 13 is a pressure diagram for centripetal compressors.

Fig. 13 illustrates a curve of $\Delta \psi$, and an increment of head coefficient with respect to $\psi$. The curve illustrates that with the increase of the depth of the compression stage in the radial direction, the increment of the head coefficient, $\Delta \psi$, becomes greater in the centripetal compressors, and that any increase in the depth of the compression stage will produce higher efficiency. The increase of the increment $\Delta \psi$ is caused by the increase of the pressure head in the centripetal compressors with respect to the centripetal head.

The dotted line in Fig. 13 connects the points of zero slope on all curves having $\lambda = 1.0$ and $\lambda > 1.0$, $$\lambda = \frac{u_1}{u_2} \text{ or } \frac{r_1}{r_2}$$

Therefore, the abscissa of Fig. 13 corresponds to the case of all axial compressors, while all curves having $\lambda > 1$ correspond to centripetal compressors.

The symbol $$\lambda = \frac{u_1}{u_2} = \frac{r_1}{r_2}$$

defines the radial stage depth in terms of the ratio of the outer and inner radii respectively of a stage. The abscissa has the value of $\lambda = 1.0$ and therefore represents any axial compressor. Any number of curves may be drawn based on values of $\lambda = 1.0$, each curve defining a special radial depth of a centripetal stage. Of these curves only one is shown, for $\lambda = 1.10$, a value most representative of centripetal compressors. The dotted line, almost vertical to the abscissa, connects the points of zero slope of all the $\lambda$ curves, as indicated on the $\lambda = 1.10$ curve.

*Volume-pressure characteristic of a centripetal compressor*

Figure 14:
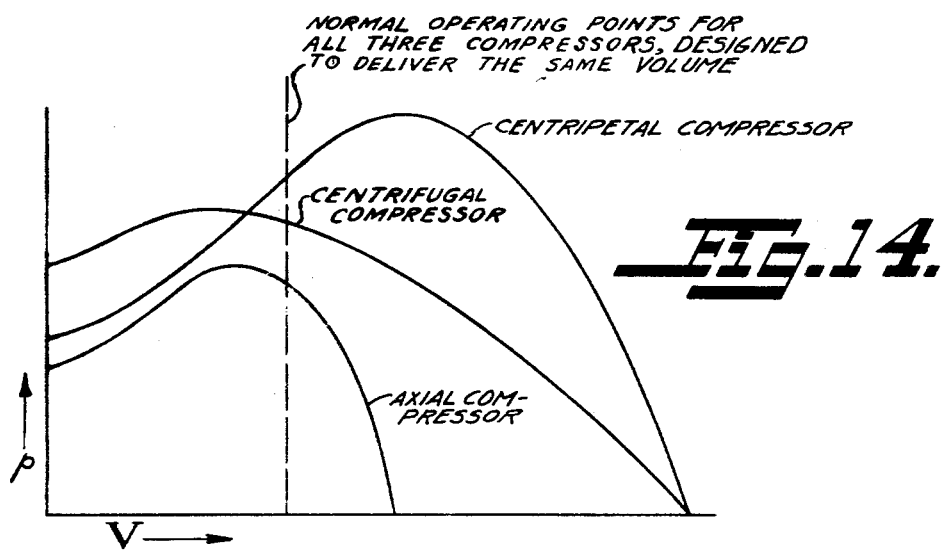
Fig. 14 is a volume-pressure diagram for axial, centrifugal and centripetal compressors.

One of the most revealing characteristic curves of any dynamic compressor is the volume-pressure curve which demonstrates the change in pressure produced by the compressor with change in the volumetric flow of fluid through the compressor at some selected speed of rotation, the curve being obtained by throttling the compressor on the output side. Typical curves for three types of compressors are illustrated in Fig. 14. Examination of these curves reveals that all compressors start with some positive pressure at zero volumetric flow, then rise to a maximum pressure and then drop rapidly toward zero pressure at maximum volumetric flow, the latter point being of purely theoretical interest. Practical operation of the centrifugal and axial compressors is possible only in the regions indicated in Fig. 14 which region has a negative slope. Operation of these compressors on the positive slope side of the curves is impossible because of flow separations taking place in that region and consequent violent surging of the machines. The operating region of the centripetal compressor is on the positive slope side of its curve, which is very desirable whenever a compressor is connected to a gas turbine as a component part of a power plant since all turbines, without exception, operate on the positive slope side of their curves. Therefore, the centripetal compressor will always "keep in step" with the power plant by delivering more air with increasing demand for more air from the turbine, and the tremendous problem of matching a turbine to the compressor or vice-versa is simplified since the two curves are substantially parallel to each other.

The fact that for maximum efficiency of the centripetal compressor the slope is positive may be shown from the equation of pressure coefficient $\psi$, which reads:

$$\psi = \frac{1}{\lambda^2} + 2\phi \cot \alpha_1 \qquad (16)$$

By differentiating with respect to the flow coefficient $\phi$, Equation 3 becomes:

$$\frac{d\psi}{d\phi} = 2 \cot \alpha_1$$

The slope of the characteristic curve is expressed by equation:

$$\frac{dp}{dV} = \frac{\phi}{V} \cdot \frac{U_1^2}{2g}\left(2\eta \cot \alpha_1 + \frac{d\eta}{d\phi}\right) \qquad (17)$$

for maximum efficiency $\eta_1$, defining the optimum design point on the characteristic curve, $$\frac{d\eta}{d\phi} = 0 \qquad (18)$$

Therefore $$\frac{dp}{dV} = 2\eta \cot \alpha_1 \left\{\frac{\phi}{V}\cdot\left(\frac{U_1^2}{2g}\right)\right\} \qquad (19)$$

from which by substituting of $$\frac{\Delta p}{\psi} = \frac{U_1^2 \gamma}{2g}$$

where $\Delta p$ is the stage pressure increase and is the mean weight density, is obtained the equation of slope of the characteristic curve:

$$\frac{dp}{dV} = 2\eta \cot \alpha_1 \cdot \left(\frac{\phi}{\psi} \cdot \frac{\Delta p}{V}\right) \qquad (20)$$

It is apparent that the slope of the characteristic curve at the design point for centripetal compressors is positive, since $$\frac{dp}{dV}$$

has positive slope.

What is claimed as new, and desired to secure by Letters Patent of the United States, is:

1. A centripetal compressor comprising a rotor having an inner compression stage and an outer compression stage located along the outer and inner peripheries, respectively, of said rotor, and a plurality of intermediate compression stages, all of said stages having a common axis of rotation, each stage having its respective radial distance from said axis to its outer periphery, a plurality of airfoils within each stage, said airfoils being uniformly spaced around each stage and having identical angles of pitch within any one given stage, the minimum angle of pitch of the airfoils of said outer stage being of the order of 15°, and the angle of pitch of any one of the remaining stages being an inverse function of the radial distance of said last-mentioned one stage from said axis of rotation.

2. A centripetal compressor comprising a rotor including a plurality of centripetal compression stages having a common axis of rotation, said stages including an outer compression stage and an inner compression stage located along the outer and inner peripheries, respectively, of said rotor, each stage having its own inner and outer peripheries and a radial distance defined as the distance from said axis to the outer periphery of the stage being considered, each stage having a plurality of airfoils, said airfoils having a uniform angle of pitch within any one given compression stage, and progressively increasing angles of pitch from the outer stage to the inner stage, the magnitude of the angle of pitch of any one given stage being an inverse function of the radial distance of such last-recited stage.

3. A centripetal compressor as defined in claim 2, in which the angle of pitch of the outer stage is between the limits of 15° and 25°.

4. A centripetal subsonic compressor for compressing a fluid, said compressor comprising a stationary contra-prerotation stage constituting an outer periphery of said compressor, and a rotatable compression stage following said contra-prerotation stage, said contra-prerotation stage having a plurality of blades defining acceleration channels, the mid-portions of said blades being curved in the direction opposite to the direction of rotation of said compression stage, whereby the direction of flow of said fluid forms an obtuse leading angle with the periphery of said compression stage, said compression stage having a plurality of air foils forming a plurality of diffusion channels between opposed surfaces of said airfoils, said compression stage, when rotated at optimum angular velocity, producing a velocity of said fluid, in a gap between said stationary contra-prerotation stage and said compression stage, having a relative local Mach number with respect to said compression stage of the order of from 0.95 to 0.8.

5. A centripetal compressor for compressing a fluid, said compressor comprising a stationary prerotation stage constituting an outer periphery of said compressor, said prerotation stage having a plurality of cambered blades uniformly distributed around the periphery of said stage, said blades defining a plurality of flow channels, each channel having preacceleration, acceleration and flow-directing portions blending into each other, whereby said prerotation stage receives said fluid at an ambient pressure and a low velocity and discharges said fluid at a subambient pressure and a high velocity, and a rotatable compression stage having a plurality of diffusion channels oriented with respect to said flow directing portion of said prerotation stage to receive said fluid at said high velocity and to discharge said fluid at a low velocity and a high pressure.

6. A centripetal compressor for compressing a fluid, said compressor comprising a stationary prerotation stage for accelerating said fluid and a compression stage for converting said accelerated fluid into a compressed fluid, said prerotation stage surrounding said compression stage, said prerotation stage having means to impart to said fluid, when said compression stage is rotating, maximum kinetic energy at the exit of said prerotation stage, and said compression stage having means for converting said kinetic energy into a potential energy of said compressed fluid.

7. A centripetal compressor for compressing a fluid, said compressor comprising a stationary prerotation stage having a plurality of acceleration channels uniformly distributed around the periphery of said prerotation stage, and a compression stage in concentric relationship with respect to said prerotation stage, said compression stage having a plurality of diffusion channels, whereby acceleration of said fluid takes place through said prerotation stage, and compression of said fluid takes place solely through said compression stage.

8. A centripetal rotary compressor for centripetally compressing a fluid, said compressor comprising a stationary prerotation stage having a plurality of blades defining a corresponding plurality of acceleration channels for said fluid, and a plurality of concentrically mounted compression stages each having a plurality of diffusion channels for compressing said fluid, whereby said fluid is accelerated to its maximum absolute velocity at the exit of said prerotation stage and said maximum absolute velocity is converted into potential energy of said fluid solely in said compression stages.

9. A centripetal compressor as defined in claim 8 in which said compression stages each includes a left hoop-ring, a right hoop-ring, and a plurality of airfoil blades mounted between said left and right hoop-rings, said airfoils having a camber, said camber determining the angle of turning of each stage, said angle of turning being an inverse function of the mean radius of the stage under consideration.

10. A centripetal compressor as defined in claim 8 in which said compression stages each includes a left hoop-ring and a right hoop-ring and a plurality of airfoil blades mounted between said hoop-rings, said airfoils having a camber, said camber determining the angle of turning of each stage, the chord line of each airfoil being inclined in the direction of rotation of said airfoil whereby the angle of pitch is a sharp angle, the angle of pitch and the angle of turning both increasing inversely with the mean radius of the stage.

11. A centripetal rotary compressor as defined in claim 8 in which said plurality of concentrically mounted compression stages includes first and second sets of compression stages, the stages of the first set interleaving the stages of the second set, a first hollow shaft supporting said first set of compression stages, a second hollow shaft supporting said second set of compression stages, said first and second shafts having a common axis of rotation whereby all of said stages are concentrically mounted with respect to each other, first means connected to said first shaft for rotating said first shaft and said first set of compression stages clockwise, and second means connected to said second shaft for rotating said second shaft and said second set of compression stages counter-clockwise.

12. A centripetal compressor as defined in claim 11 in which said compressor includes a first side-disc, said first set of compression stages being mounted on said first side-disc, said first shaft having inner and outer ends, the inner end of said first shaft being connected to said first side-disc, said inner end of the first shaft and the adjacent part of the first side-disc forming a smooth funnel-shaped surface for conveying at least some of said fluid, after its compression in said compression stages, into and through a hollow duct formed by the hollow portion of said first shaft, and for discharging said fluid at the outer end of said first hollow shaft.

13. A centripetal compressor as defined in claim 12 which also includes a second side-disc, said second set of compression stages being mounted on said second side-disc, said second shaft having inner and outer ends, the inner end of said second shaft being connected to said second side-disc, said inner end of the second shaft and the adjacent part of the second side-disc forming a smooth, funnel-shaped surface for conveying the remaining portion of said fluid into and through a hollow duct formed by the hollow portion of said second shaft, and for discharging said fluid at the outer end of said second hollow shaft.

14. A centripetal subsonic compressor for compressing a fluid, said compressor comprising a prerotation stage having a plurality of blades, said blades being uniformly distributed around the periphery of said prerotation stage, said blades being shaped to produce a plurality of input channels for said fluid, each of said input channels having preacceleration, acceleration and flow-directing portions blending into each other, and a plurality of concentrically mounted compression stages for compressing said fluid in centripetal direction, each of said stages having a plurality of airfoils, said airfoils having the shapes and the angles of pitch in the respective stages to define the boundaries of respective flow channels, said flow channels being diffusion and compression channels.

15. A centripetal compressor including a prerotation stage, a plurality of concentrically mounted contra-rotatable compression stages, and means for rotating even-numbered stages in a clockwise direction and the odd-numbered stages in a counter-clockwise direction, said means, when rotated, rotating said odd and even numbered stages at two equal but opposite angular velocities.

16. A centripetal compressor comprising a plurality of concentrically mounted compression stages, a prerotation stage surrounding, and in concentric relationship with respect to, the outer compression stage of said compressor, said prerotation stage having an acceleration and flow-directing channel on its output side, and said compression stages each having a plurality of compression channels, each compression channel having an input side and an output side along the outer and inner peripheries respectively of each stage, each preceding output being oriented with respect to the succeeding input to make the respective stages carry a load proportional to the square of the radial distance of said compression stage from the axis of rotation.

17. A centripetal compressor for compressing a fluid comprising a plurality of concentric compression stages, the even-numbered stages rotatable in a clockwise direction and the odd-numbered stages rotatable in a counter-clockwise direction, the angular velocities of all stages, when rotated, being equal, and the even-numbered stages being interleaved with the odd-numbered stages, said compression stages each having a plurality of compression channels each having an input side along the outer periphery and an output side along the inner periphery of said stage, each preceding output being oriented with respect to the succeeding input to make said stages compress according to the equation $$C_{u_n} - C_{u_{n+1}} = U_{n+1}$$

where $C_{u_n}$ is the projection of the absolute velocity of said fluid, $C_n$, at the intput side of any stage on the outer peripheral velocity vector $U_n$ of said input side;

$C_{u_{n+1}}$ is the projection of the absolute velocity of said fluid, $C_{n+1}$, at the output side of said any stage on the inner peripheral velocity vector $U_{n+1}$ of said output side;

$U_{n+1}$ is the inner peripheral velocity vector of said output side of said any stage.

18. A centripetal compressor for compressing a fluid, said compressor comprising a plurality of concentrically mounted compression stages, each having a plurality of diffusion channels, airfoils uniformly distributed around the peripheries of said stages, the opposed surfaces of adjacent airfoils defining the boundaries of said channels in the planes passing through the axis of rotation for said stages, means for rotating said stages at equal angular velocities, said airfoils having equal angles of pitch within any given stage and progressively increasing angles of pitch, from stage-to-stage, in the centripetal direction, the angle of pitch of said airfoils in the respective stages and said equal angular velocities making the mechanical compression work of each stage a function of the square of the radius of rotation and of the square of the angular velocity of each stage.

19. A centripetal compressor for compressing a fluid, said compressor having an outer periphery, a stationary contra-prerotation stage located along the outer periphery of said compressor, said contra-prerotation stage having two side-walls and a plurality of cambered airfoils mounted between said side-walls and uniformly spaced around the periphery of said contra-prerotation stage to produce a plurality of acceleration and flow-directing channels for accelerating and directing the flow of said fluid, N compression stages, where N is a whole number, said compression stages being concentrically mounted with respect to said stationary contra-prerotation stage, a single shaft for rotating said compression stages at the same angular velocity for centripetally compressing said fluid, and ($N-1$) stationary, fluid-turning and flow-directing stages, said flow-directing stationary stages being positioned between the respective compression stages.

20. A centripetal compressor as defined in claim 19 in which said stationary stages have substantially constant width flow channels, said width being measured in a plane perpendicular to the axis of rotation.

21. A centripetal compressor comprising a contra-prerotation stage having two side-walls and a plurality of cambered blades mounted between said side-walls, a plurality of concentrically mounted compression stages, said contra-prerotation stage having a plurality of flow channels defined by the outer surfaces of said blades and the inner surfaces of said side-walls, said flow channels having substantially radial directions on the input side and slanting on the output side in the direction opposite to the direction of rotation of the first compression stage, and a plurality of airfoils in the first stage of said compressor, the chords of said airfoils slanting in the direction of rotation of said first stage, whereby the leading tails of said airfoils are leading the trailing edges of said airfoils when said first stage is rotated.

22. A centripetal rotary compressor for compressing fluid, said compressor comprising a stationary contra-prerotation stage having a plurality of flow channels terminating in the fluid accelerating and flow-directing portions of said channels on the output side of said channels, the mid-flow portion in any channel being defined by a median flow line, a first rotatable compression stage in concentric relationship with respect to said stationary contra-prerotation stage, said fluid accelerating and flow-directing portions of said channels being turned in the direction opposite to the direction of rotation of said first stage, whereby said median flow line, when continued to the point of intersection of said line with the outer periphery of said first stage, forms an obtuse leading angle with the tangent to said periphery at said point, said leading angle being the first angle encountered when one moves in the direction of rotation of said first compression stage.

23. A centripetal compressor for compressing a fluid, said compressor comprising a radial flow channel composed of a stationary contra-prerotation stage at the entry of said fluid into said compressor, a plurality of concentric compression stages, said contra-prerotation stage and said compression stages having side walls, all of said side walls defining the side profiles and the axial width of said channel in a plane passing through the axis of rotation of said compressor, said width being a function of the equations of state and continuity of said fluid at any given point within said channel.

24. A centripetal compressor for dynamically compressing a fluid, said compressor having a plurality of compression stages, each of said stages comprising two side rings and a plurality of airfoils between said two side rings, the width of said airfoils, in the direction parallel to the axis of rotation of said stages, being a function of the local density of the fluid and also a function of the change in the local radial velocity of the fluid.

25. A centripetal compressor for compressing a fluid, said compressor comprising a plurality of compression stages, each stage including two side rings and a plurality of airfoils mounted between said rings, the length of said airfoils in the direction parallel to the axis of their rotation decreasing from the outer stage to substantially intermediate stage, and increasing from said intermediate stage to the inner stage, and the distance between the two inner edges of two rings of any stage, said inner edges defining the inner periphery of said stage, being smaller than the distance between the two inner edges of the two rings of the succeeding stage, said two inner edges of the two rings of the succeeding stage defining the outer periphery of said succeeding stage, whereby the boundary layer formed by said fluid along the inner surfaces of said rings is discharged into the greater axial width of the succeeding stage.

26. A centripetal compressor for compressing a fluid, said compressor comprising a stationary contra-prerotation stage constituting the outer periphery of said compressor, first and second shafts having a common longitudinal and rotational axis, at least one discharge duct at the exit from said compressor, said discharge duct being co-axially positioned with said shafts, first and second side-discs mounted respectively on said first and second shafts, and a plurality of compression stages mounted on each disc, the stages on the first side-disc interleaving with the stages of the second side-disc, said stages including a first input stage at the exit from said contra-prerotation stage and at the entry into the rotating part of said compressor, and an output stage at the exit from the fluid compressing part of said compressor, said duct having a radial flow input portion adjacent to the inner periphery of said output stage, said duct also having an axial flow portion whose longitudinal axis coincides with the longitudinal and rotational axis of said first and second shafts, and a curved, funnel-shaped portion connecting said radial flow portion of said duct with the axial flow portion of said duct, said fluid entering said compressor in a centripetally radial direction and leaving said compressor in an axial direction through said axial flow portion of said duct.

References Cited in the file of this patent

UNITED STATES PATENTS

| Number | Name | Date |
|---|---|---|
| 1,091,581 | Ljungstrom | Mar. 31, 1914 |
| 1,644,565 | Crave | Oct. 4, 1927 |
| 1,748,979 | Gunderson | Mar. 4, 1930 |
| 1,916,175 | Lysholm et al. | June 27, 1933 |
| 2,357,778 | Beaven | Sept. 5, 1944 |
| 2,361,726 | Weimar | Oct. 31, 1944 |
| 2,374,671 | Dupont | May 1, 1945 |
| 2,391,779 | Griffith | Dec. 25, 1945 |
| 2,458,006 | Kilgore | Jan. 4, 1949 |
| 2,471,892 | Price | May 31, 1949 |
| 2,484,554 | Concordia | Oct. 11, 1949 |

FOREIGN PATENTS

| Number | Country | Date |
|---|---|---|
| 614,160 | Great Britain | Dec. 10, 1948 |